United States Patent
Ogawa

(10) Patent No.: US 8,929,628 B2
(45) Date of Patent: Jan. 6, 2015

(54) MEASURING DEVICE AND MEASURING METHOD

(71) Applicant: Olympus Corporation, Hachioji-shi, Tokyo (JP)

(72) Inventor: Kiyotomi Ogawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 194 days.

(21) Appl. No.: 13/746,591

(22) Filed: Jan. 22, 2013

(65) Prior Publication Data

US 2014/0002348 A1 Jan. 2, 2014

(30) Foreign Application Priority Data

Jul. 2, 2012 (JP) ................................. 2012-148392

(51) Int. Cl.
*G06K 9/00* (2006.01)
*G01B 11/28* (2006.01)
*G01B 11/02* (2006.01)

(52) U.S. Cl.
CPC .............. *G01B 11/28* (2013.01); *G01B 11/285* (2013.01); *G01B 11/02* (2013.01)
USPC ........... 382/128; 382/130; 382/131; 382/132; 600/443; 600/425; 600/322; 600/317

(58) Field of Classification Search
CPC .......... A61B 5/06; A61B 5/1076; A61B 8/12; A61B 8/14; A61B 8/42; G01B 11/02; G01B 11/28; G01B 11/285
USPC .......... 382/128, 130, 131, 132; 600/118, 119, 600/104, 317, 322, 425, 121, 443; 351/204
See application file for complete search history.

(56) References Cited

U.S. PATENT DOCUMENTS

| 7,048,685 | B2 | 5/2006 | Sakiyama | |
|---|---|---|---|---|
| 2001/0040991 | A1* | 11/2001 | Asano et al. | 382/128 |
| 2005/0090743 | A1* | 4/2005 | Kawashima et al. | 600/443 |
| 2010/0317965 | A1* | 12/2010 | Itkowitz et al. | 600/425 |

FOREIGN PATENT DOCUMENTS

| JP | 06-339454 A | 12/1994 |
|---|---|---|
| JP | 07-210688 A | 8/1995 |
| JP | 2001-275934 A | 10/2001 |
| JP | 2004-049638 A | 2/2004 |

* cited by examiner

*Primary Examiner* — Ali Bayat
(74) *Attorney, Agent, or Firm* — Holtz, Holtz, Goodman & Chick PC

(57) ABSTRACT

The measuring unit computes at least one of an area and a perimetrical length of a polygon, based on three or more measuring points including an indeterminate point of which a position is changed by a move instruction input through an operation unit, wherein the measuring points are designated on the image by an instruction of a user input through the operation unit. The controller updates the position of the indeterminate point, when the move instruction is input through the operation unit after display the computational result, controls the measuring unit to recompute at least one of the area and the perimetrical length of the polygon based on the measuring points including the updated indeterminate point, and controls the display unit to display at least one of the recomputed area and the recomputed perimetrical length of the polygon, as recomputational result after updated the indeterminate point.

17 Claims, 24 Drawing Sheets

FIG. 11A

| VERTEX NUMBER | TWO-DIMENSIONAL COORDINATES | THREE-DIMENSIONAL COORDINATES | CLASS | ADJACENT VERTEX |
|---|---|---|---|---|
| 1 | x1, y1 | X1, Y1, Z1 | MOVING VERTEX | – |

FIG. 11B

| VERTEX NUMBER | TWO-DIMENSIONAL COORDINATES | THREE-DIMENSIONAL COORDINATES | CLASS | ADJACENT VERTEX |
|---|---|---|---|---|
| 1 | x1, y1 | X1, Y1, Z1 | DETERMINATE VERTEX | 2 |
| 2 | x2, y2 | X2, Y2, Z2 | MOVING VERTEX | 1 |

FIG. 11C

| VERTEX NUMBER | TWO-DIMENSIONAL COORDINATES | THREE-DIMENSIONAL COORDINATES | CLASS | ADJACENT VERTEX |
|---|---|---|---|---|
| 1 | x1, y1 | X1, Y1, Z1 | DETERMINATE VERTEX | 3, 2 |
| 2 | x2, y2 | X2, Y2, Z2 | DETERMINATE VERTEX | 1, 3 |
| 3 | x3, y3 | X3, Y3, Z3 | MOVING VERTEX | 2, 1 |

FIG. 11D

| VERTEX NUMBER | TWO-DIMENSIONAL COORDINATES | THREE-DIMENSIONAL COORDINATES | CLASS | ADJACENT VERTEX |
|---|---|---|---|---|
| 1 | x1, y1 | X1, Y1, Z1 | DETERMINATE VERTEX | 4, 2 |
| 2 | x2, y2 | X2, Y2, Z2 | DETERMINATE VERTEX | 1, 3 |
| 3 | x3, y3 | X3, Y3, Z3 | DETERMINATE VERTEX | 2, 4 |
| 4 | x4, y4 | X4, Y4, Z4 | MOVING VERTEX | 3, 1 |

FIG. 13A

| VERTEX NUMBER | TWO-DIMENSIONAL COORDINATES | THREE-DIMENSIONAL COORDINATES | CLASS | ADJACENT VERTEX |
|---|---|---|---|---|
| 1 | x1, y1 | X1, Y1, Z1 | DETERMINATE VERTEX | 5, 2 |
| 2 | x2, y2 | X2, Y2, Z2 | DETERMINATE VERTEX | 1, 3 |
| 3 | x3, y3 | X3, Y3, Z3 | DETERMINATE VERTEX | 2, 4 |
| 4 | x4, y4 | X4, Y4, Z4 | DETERMINATE VERTEX | 3, 5 |
| 5 | x5, y5 | X5, Y5, Z5 | MOVING VERTEX | 4, 1 |

FIG. 13B

| VERTEX NUMBER | TWO-DIMENSIONAL COORDINATES | THREE-DIMENSIONAL COORDINATES | CLASS | ADJACENT VERTEX |
|---|---|---|---|---|
| 1 | x1, y1 | X1, Y1, Z1 | DETERMINATE VERTEX | 4, 2 |
| 2 | x2, y2 | X2, Y2, Z2 | DETERMINATE VERTEX | 1, 3 |
| 3 | x3, y3 | X3, Y3, Z3 | DETERMINATE VERTEX | 2, 4 |
| 4 | x4, y4 | X4, Y4, Z4 | DETERMINATE VERTEX | 3, 1 |

FIG. 16A
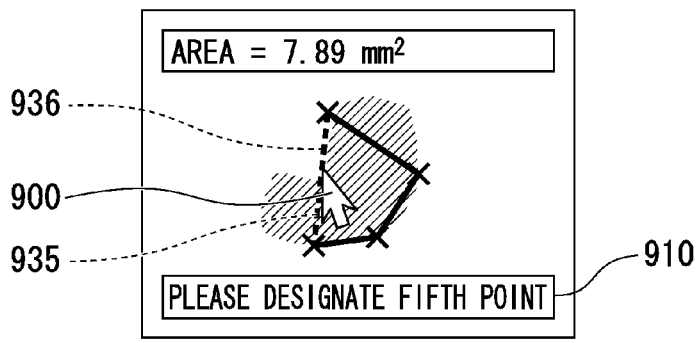
FIG. 16B
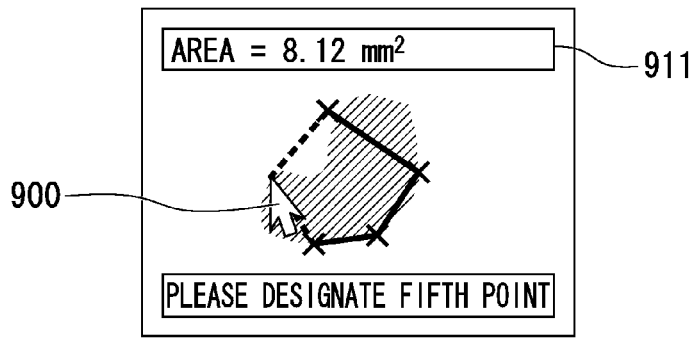
FIG. 17
| VERTEX NUMBER | TWO-DIMENSIONAL COORDINATES | THREE-DIMENSIONAL COORDINATES | CLASS | ADJACENT VERTEX |
|---|---|---|---|---|
| 1 | x1, y1 | X1, Y1, Z1 | DETERMINATE VERTEX | 4, 2 |
| 2 | x2, y2 | X2, Y2, Z2 | DETERMINATE VERTEX | 1, 3 |
| 3 | x3, y3 | X3, Y3, Z3 | DETERMINATE VERTEX | 2, 5 |
| 4 | x4, y4 | X4, Y4, Z4 | DETERMINATE VERTEX | 5, 1 |
| 5 | x5, y5 | – | MOVING VERTEX | 3, 4 |

FIG. 21A

| SIDE NUMBER | INCLUDED VERTEX |
|---|---|
| L12 | 1, 2 |
| L23 | 2, 3 |
| L34 | 3, 4 |
| L41 | 4, 1 |

FIG. 21B

| SIDE NUMBER | INCLUDED VERTEX |
|---|---|
| L12 | 1, 2 |
| L23 | 2, 3 |

FIG. 21C

| SIDE NUMBER | INCLUDED VERTEX |
|---|---|
| L12 | 1, 2 |
| L23 | 2, 3 |
| L31 | 3, 1 |

FIG. 21D

| SIDE NUMBER | INCLUDED VERTEX |
|---|---|
| L23 | 2, 3 |
| L31 | 3, 1 |

FIG. 21E

| SIDE NUMBER | INCLUDED VERTEX |
|---|---|
| L23 | 2, 3 |
| L31 | 3, 1 |
| L14 | 1, 4 |
| L42 | 4, 2 |

MEASURING DEVICE AND MEASURING METHOD

BACKGROUND OF THE INVENTION

1. Field of the Invention

The present invention relates to a measuring device and a measuring method in which a region in an image is measured based on the image data generated by imaging a subject.

This application claims priority to and the benefit of Japanese Patent Application No. 2012-148392 filed on Jul. 2, 2012, the disclosure of which is incorporated herein by reference.

2. Description of Related Art

As a method of measuring an area of a region in an image, a generally used method is that a shape of the region of which the area is to be measured is approximated to a polygon, the polygon is divided into a plurality of triangles, and the areas of the divided triangles are summed to obtain the area of the polygon. Japanese Unexamined Patent Application, First Publication No. 2001-275934 discloses a method of designating a polygon of which an area is to be measured.

A method of measuring an area by dividing a polygon into a plurality of triangles is disclosed in Japanese Unexamined Patent Application, First Publication No. H6-339454.

In addition, Japanese Unexamined Patent Application, First Publication No. H7-210688 discloses another method of dividing a polygon into a plurality of triangles.

SUMMARY OF THE INVENTION

According to a first aspect of the present invention, there is provided a measuring device including: an imaging unit which images a subject to generate an image data, a display unit which displays an image based on the image data, a measuring unit which computes at least one of an area and a perimetrical length of a polygon, based on three or more measuring points including an indeterminate point of which a position is changed by a move instruction input through an operation unit, wherein the measuring points are designated on the image by an instruction of a user input through the operation unit, and a controller which controls the measuring unit to compute at least one of the area and the perimetrical length of the polygon based on the measuring points, and controls the display unit to display at least one of the computed area and the computed perimetrical length of the polygon as computational result, Wherein the controller which updates the position of the indeterminate point, when the move instruction is input through the operation unit after display the computational result, controls the measuring unit to recompute at least one of the area and the perimetrical length of the polygon based on the measuring points including the updated indeterminate point, and controls the display unit to display at least one of the recomputed area and the recomputed perimetrical length of the polygon, as recomputational result after updated the indeterminate point.

According to a second aspect of the present invention, in the measuring device according to the first aspect, the measuring points further comprise a determinate point of which a position is fixed regardless of the move instruction input through the operation unit According to a third aspect of the present invention, in the measuring device according to the second aspect, when a determine instruction is input through the operation unit, the controller further changes at least one point of the indeterminate points to the determinate point.

According to a fourth aspect of the present invention, in the measuring device according to the second aspect, when a modification instruction is input through the operation unit, the controller further selects any one of the determinate points, and changes the selected determinate point to the indeterminate point.

According to a fifth aspect of the present invention, in the measuring device according to the second aspect, when an insert instruction is input through the operation unit, the controller further generates a new indeterminate point, deletes one of the sides which configures the polygon and include the two determinate points, and insert two sides including each of two of the determinate points included in the deleted side and the new added indeterminate points into the sides being configured with the polygon.

According to a sixth aspect of the present invention, in the measuring device according to the second aspect, the controller further changes the sides being configured with the polygon so that the sides do not cross each other, when at least one side of the two sides, which configure the polygon and include the indeterminate points, crosses any one of the sides composing the polygon other than the two sides.

According to a seventh aspect of the present invention, in the measuring device according to the third aspect, when the determine instruction is input through the operation unit, the controller further generates a new indeterminate point.

According to an eighth aspect of the present invention, in the measuring device according to the seventh aspect, the controller generates a new indeterminate point at the position of the measuring point that is last changed to the determinate point.

According to a ninth aspect of the present invention, in the measuring device according to the seventh aspect, the controller controls to generate a new indeterminate point at the center of the side which composes the polygon and includes the measuring point last changed to the determinate point.

According to a tenth aspect of the present invention, in the measuring device according to the seventh aspect, the controller generate a new indeterminate point at the position deviating by a predetermined distance from the measuring point last changed to the determinate point.

According to a eleventh aspect of the present invention, there is provided a measuring method including: a first step of imaging a subject by an imaging unit to generate image data, and displaying an image based on the generated image data by a display unit, a second step of computing at least one of an area and a perimetrical length of a polygon by a measuring unit based on three or more measuring points including an indeterminate point of which the position is changed by a move instruction input through an operation unit, wherein the measuring points are designated on the image by an instruction of a user input through the operation unit, a third step of displaying at least one of the area and the perimetrical length of the polygon computed in the second step by the display unit, a fourth step of updating the position of the indeterminate point by a controller when the move instruction is input through the operation unit after the third step, a fifth step of computing at least one of the area and the perimetrical length of the polygon by the measuring unit based on the measuring point including the updated indeterminate point and a sixth step of displaying at least one of the area and the perimetrical length of the polygon computed in the fifth step by the display unit.

BRIEF DESCRIPTION OF THE DRAWINGS

FIG. 11A is a view referentially showing the contents of a vertex table in the first embodiment of the present invention.

FIG. 11B is a view referentially showing the contents of the vertex table in the first embodiment of the present invention.

FIG. 11C is a view referentially showing the contents of the vertex table in the first embodiment of the present invention.

FIG. 11D is a view referentially showing the contents of the vertex table in the first embodiment of the present invention.

FIG. 13A is a view referentially showing the contents of the vertex table in the first embodiment of the present invention.

FIG. 13B is a view referentially showing the contents of the vertex table in the first embodiment of the present invention.

FIG. 16A is a view referentially showing an image displayed on the screen of the monitor included in the endoscope device according to the first embodiment of the present invention.

FIG. 16B is a view referentially showing an image displayed on the screen of the monitor included in the endoscope device according to the first embodiment of the present invention.

FIG. 17 is a view referentially showing the contents of the vertex table in the first embodiment of the present invention.

FIG. 21A is a view referentially showing the contents of a side table in the first embodiment of the present invention.

FIG. 21B is a view referentially showing the contents of the side table in the first embodiment of the present invention.

FIG. 21C is a view referentially showing the contents of the side table in the first embodiment of the present invention.

FIG. 21D is a view referentially showing the contents of the side table in the first embodiment of the present invention.

FIG. 21E is a view referentially showing the contents of the side table in the first embodiment of the present invention.

DETAILED DESCRIPTION OF THE INVENTION

Hereinafter, exemplary embodiments will be described in detail with reference to the drawings.

(First Embodiment)

Figure 1:
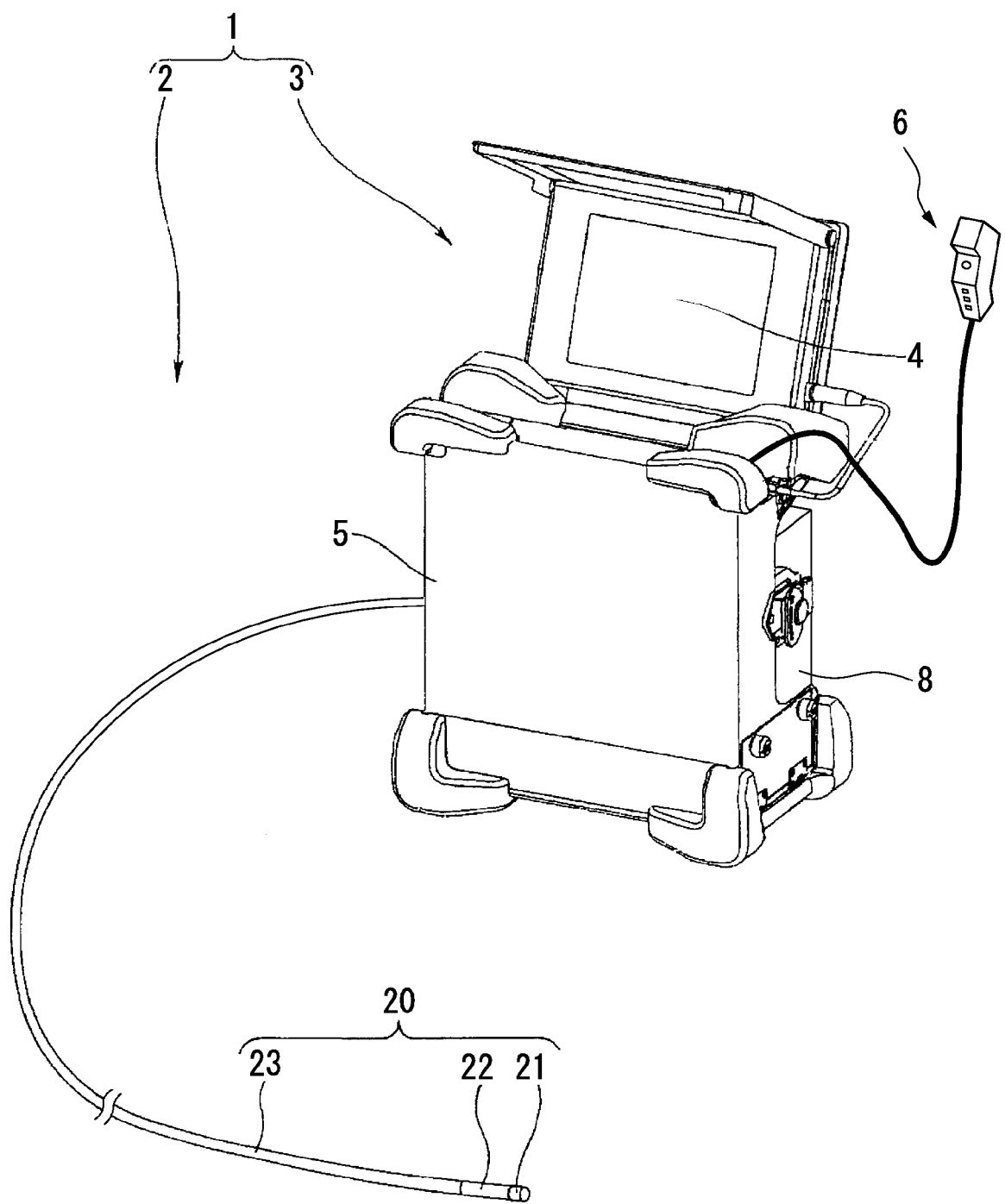
FIG. 1 is a perspective view showing an overall configuration of an endoscope device according to a first embodiment of the present invention.

First, a first embodiment of the present invention will be described. FIG. 1 shows an overall configuration of an endoscope device, which is an example of a measuring device according to the present embodiment. As shown in FIG. 1, an endoscope device 1 includes an endoscope unit 2 and a device body 3 connected to the endoscope unit 2. The endoscope unit 2 includes an elongated insert part 20 and a connector unit 8 to which a base portion of the elongated insert part 20 is connected. The connector unit 8 includes a connector (not shown) and is connected to the device body 3 via the connector, and is configured to be detachably connected to the device body 3. The device body 3 includes a monitor 4 (a liquid crystal monitor), which is a display device for displaying an image of a subject imaged by the endoscope unit 2 or operation control contents (for example, a processing menu), etc., and a housing 5 having a control unit 10 (see FIG. 2) inside. An operation unit 6 for executing necessary operations when performing various operation controls of the whole device is connected to the device body 3.

The insert part 20 includes a hard front end portion 21, a bending portion 22 bendable vertically and horizontally, for example, and a flexible tube portion 23 having flexibility, which extend from the front end in this sequence. An optical adapter of various classes such as a stereo optical adapter having two observation visual fields or an ordinary observation optical adapter is detachably attached to the front end portion 21.

Figure 2:
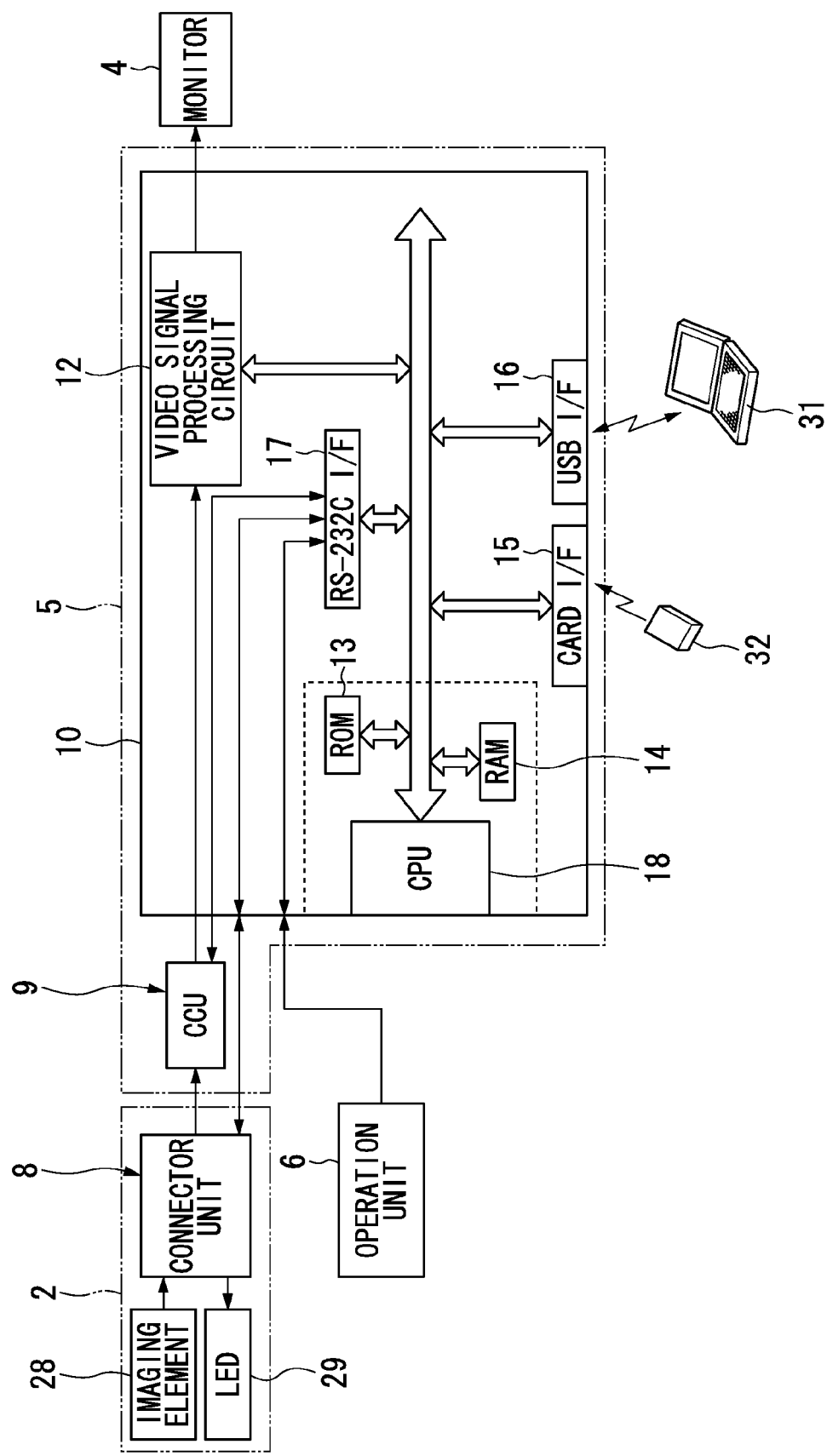
FIG. 2 is a block diagram showing an internal structure of the endoscope device according to the first embodiment of the present invention.

As shown in FIG. 2, a CCU (camera control unit) 9 and the control unit 10 are installed in the housing 5. The base portion of the insert part 20 is connected to the connector unit 8, and the connector unit 8 is connected to the device body 3 via the connector. The connector unit 8 includes a light source driving device for driving the light source embedded in the front end portion 21 and a bending device for bending the bending portion 22 composing the insert part 20. The CCU 9 includes a driving device for driving an imaging element 28.

The imaging element 28 and an LED 29 are provided in the front end portion 21. The imaging element 28 photoelectrically converts the subject image imaged through the optical adapter and generates an imaging signal. The imaging signal is converted into a video signal (image data) such as an NTSC signal in the CCU 9, for example, and supplied to the control unit 10. The LED 29 emits radiation light to irradiate the subject.

In the control unit 10, a video signal processing circuit 12 to which the video signal is input, a ROM 13, a RAM 14, a card I/F 15 (card interface), a USB I/F 16 (USB interface), an RS-232C I/F 17 (RS-232C interface), and a CPU 18 are installed.

The CCU 9 and the connector unit 8 are connected to the RS-232C I/F 17, and the operation unit 6 for instructing control and operation to the CCU 9 or the connector unit 8 is also connected to the RS-232C I/F 17. When a user operates the operation unit 6, communication necessary for controlling the CCU 9 and the connector unit 8 is performed based on the use's operation.

The USB I/F 16 is an interface for electrically connecting the control unit 10 to a personal computer 31. By connecting the control unit 10 and the personal computer 31 through the USB I/F 16, it is possible to control the control unit from the personal computer 31 based on an instruction for displaying an endoscope image or various instructions such as image processing during measurement, and it is possible to input/output control information or data necessary for various processing between the control unit 10 and the personal computer 31.

In addition, the card I/F 15 includes a memory card 32 which may be freely detachable thereon. By mounting the memory card 32 on the card I/F 15, it may import data such as control processing information or image information stored in the memory card 32 into the control unit 10, or record data such as the control processing information or image information in the memory card 32, according to the control of the CPU 18.

In order to display a synthesized image in which an endoscope image is synthesized with a graphic operation menu based on a video signal supplied from the CCU 9, the video signal processing circuit 12 performs a process of synthesizing the graphic image signal generated by the CPU 18 based on the operation menu and the video signal from the CCU 9, or a process for displaying on the screen of the monitor 4, and supplies a display signal to the monitor 4. The video signal processing circuit 12 may also perform a process of simply displaying the endoscope image or images such as the operation menu separately. Thus, the endoscope image, operation menu image, and synthesized image of the endoscope image and operation menu image are displayed on the screen of the monitor 4.

The CPU 18 controls various circuit units so as to perform processes according to purposes by running the programs stored in the ROM 13 and controls the whole operation of the endoscope device 1. The CPU 18 uses the RAM 14 as a working area for temporarily storing the data.

The program run by the CPU 18 may be recorded in a computer readable recording medium and the program recorded in the recording medium may be read in and run by a computer other than the endoscope device 1. For example, the personal computer 31 reads and runs the program, sends control information for controlling the endoscope device 1 to the endoscope device 1, and obtains video signals from the endoscope device 1 and may perform measuring using the obtained video signals.

Here, the "computer" also includes a homepage providing environment (or displaying environment) if a WWW system is used. Further, "computer readable recording medium" refer to portable medium such as a flexible disk, a magneto-optical disc, a ROM, a CD-ROM, a DVD-ROM, a flash memory and so on and a storage device such as a hard disk embedded in the computer. The "computer readable recording medium" also includes those storing the program for a certain time such as a volatile random access memory (RAM) inside the computer system that becomes a server or client, when the program is sent through a network such as the Internet or a communication line such as a telephone line.

In addition, the above-mentioned program may be sent to another computer from the computer in which the program is stored in the storage device through a transmission medium or the transmission wave in the transmission medium. Here, the "transmission medium" for transmitting a program refers to a medium that has a function of transmitting information like the network (the communication network) such as the Internet or the communication line such as the telephone circuit. Further, the above-mentioned program may be one for implementing a part of the above-mentioned function. Furthermore, the above-mentioned function may be one that is implemented by a combination with the program already recorded in the computer, known as a differential file (a differential program).

Figure 3:
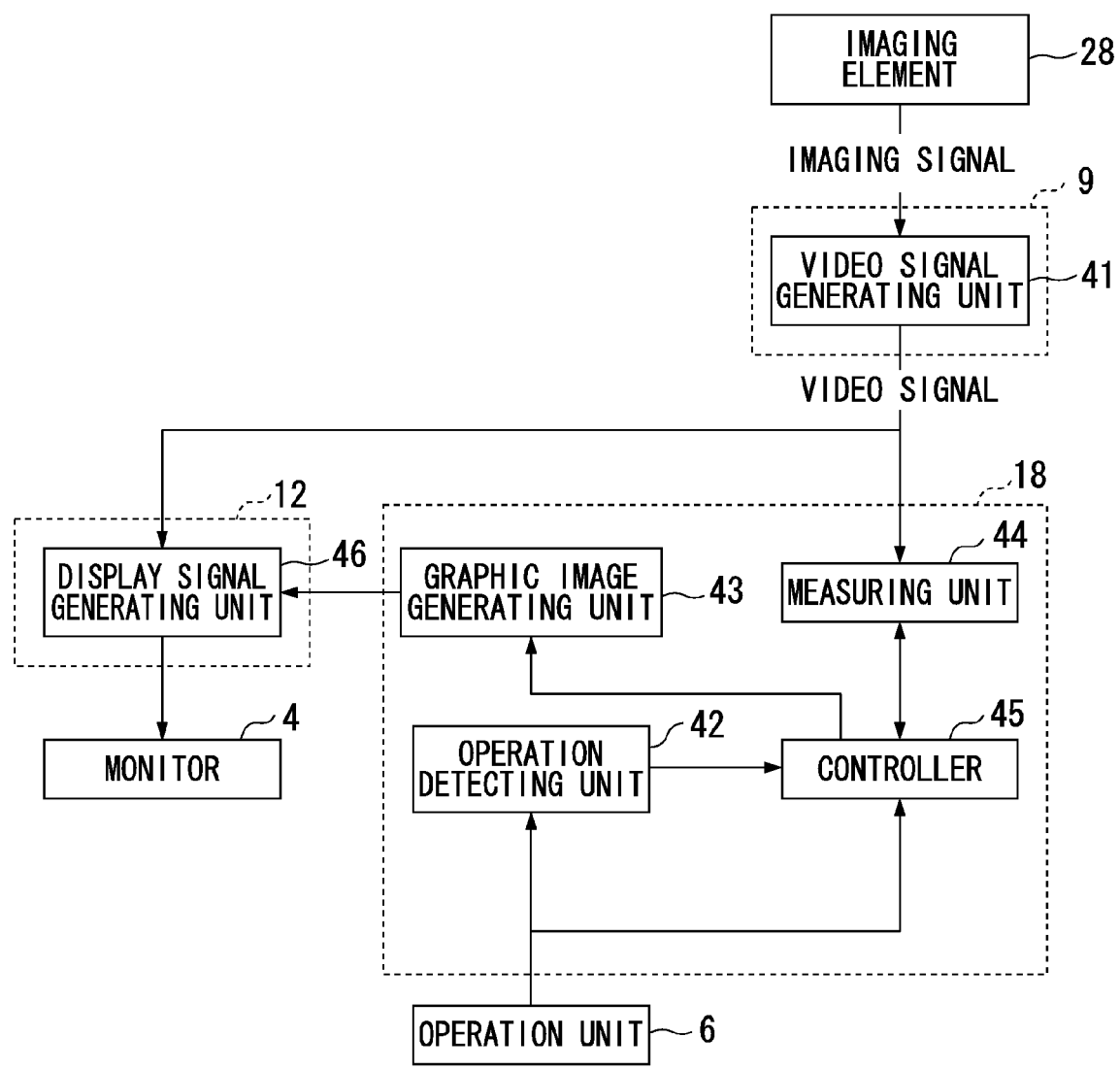
FIG. 3 is a flow diagram showing an operation procedure of the endoscope device according to the first embodiment of the present invention.
Figure 4:
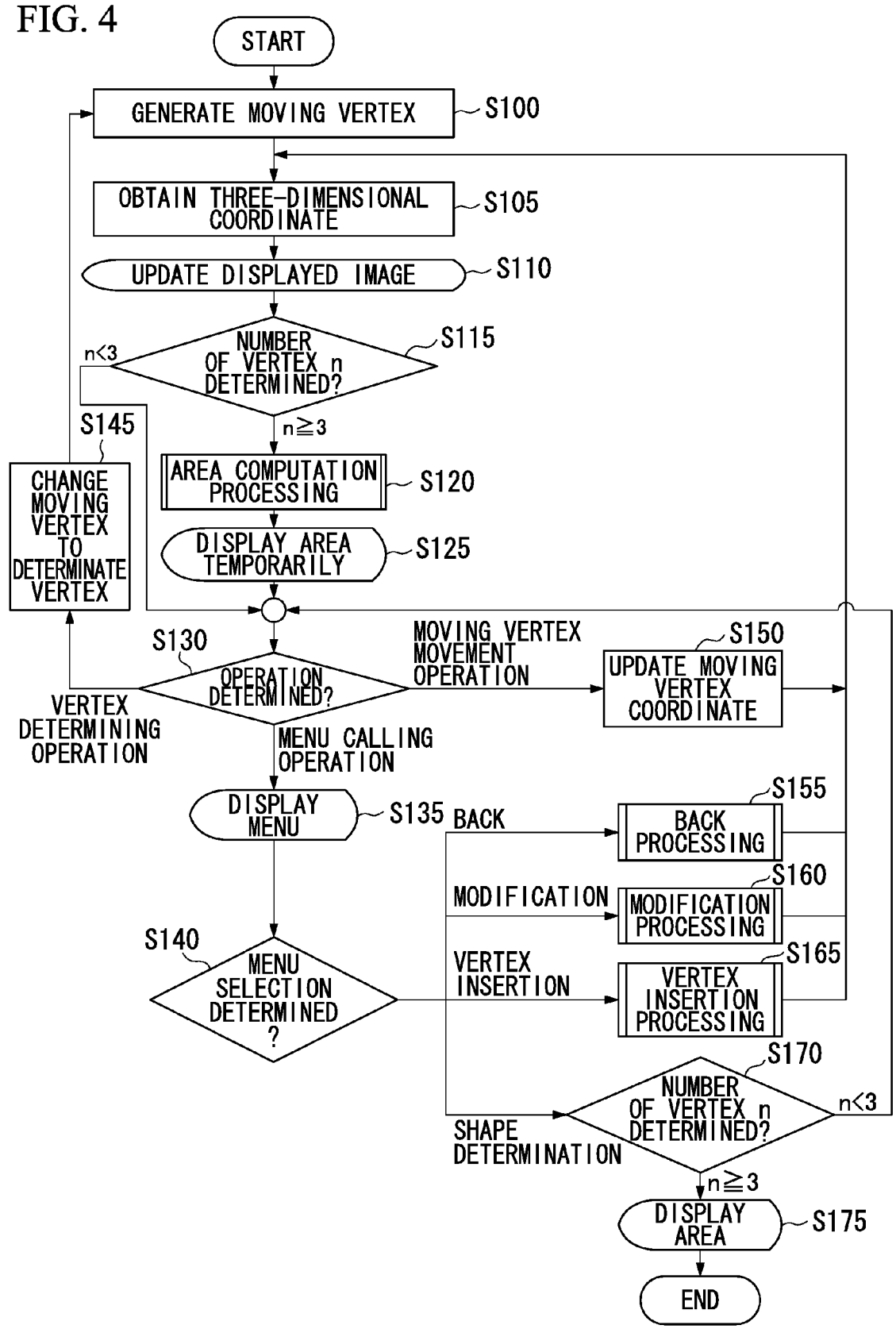
FIG. 4 is a flow chart showing an operation procedure of the endoscope device according to the first embodiment of the present invention.

FIG. 3 shows the functional configuration of the part that is the center of the present embodiment, in the endoscope device 1. A video signal generating unit 41 corresponds to the function of the CCU 9. The video signal generating unit 41 generates video signals based on the imaging signals output from the imaging element 28.

An operation detecting unit 42, a graphic image generating unit 43, a measuring unit 44 and a controller 45 correspond to the functions of the CPU 18. The operation detecting unit 42 detects the operation of the operation unit 6 by the user, and computes the display position of the pointing cursor displayed on the screen of the monitor 4, depending on the user's operation.

Using the pointing cursor, the user designates the position for setting the measuring point that indicates the measurement position on the subject, on the image displayed on the screen of the monitor 4. By operating the pointing device installed on the operation unit 6, the user may move the pointing cursor within the screen of the monitor 4. The pointing device of the present embodiment includes a joystick that may designate eight directions, and an enter button and menu button operated by pushing, for example.

The graphic image generating unit 43 generates the graphic image signals including the pointing cursor or the operation menu displayed on the screen of the monitor 4. The measuring unit 44 performs the measuring process based on the video signals generated by the video signal generating unit 41. The measuring process is a process in which three-dimensional coordinates of the measuring point set by the user are computed using the pointing cursor, and the area or the perimetrical length of three or more polygon composed of the measuring points is computed using the three-dimensional coordinates of the measuring points. The controller 45 controls the assignment of processes to each of the operation detecting unit 42, the graphic image generating unit 43 and the measuring unit 44 and controls the overall operation of the endoscope device 1.

A display signal generating unit 46 corresponds to the function of the video signal processing circuit 12. The display signal generating unit 46 synthesizes the video signals generated by the video signal generating unit 41 and the graphic image signals generated by the graphic image generating unit 43, and generates the display signals. The monitor 4 displays the image based on the display signals generated by the display signal generating unit 46.

Figure 25:
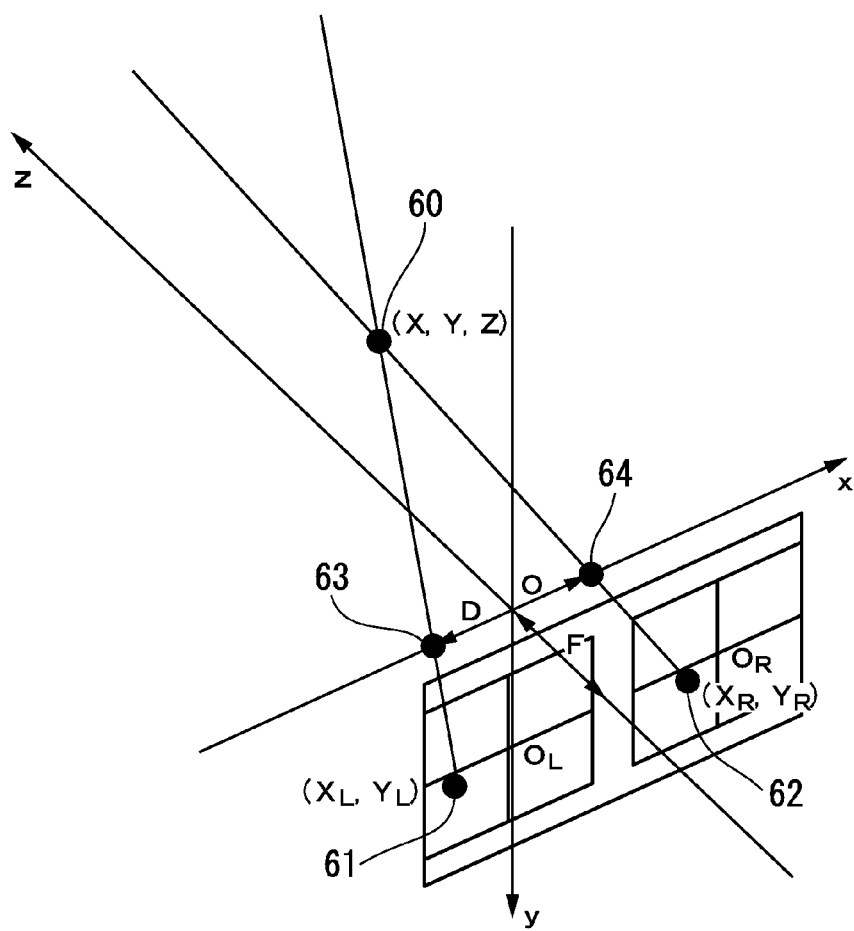
FIG. 25 is a view referentially describing how three-dimensional coordinates of measuring points are obtained according to a stereo measurement.
Figure 26:
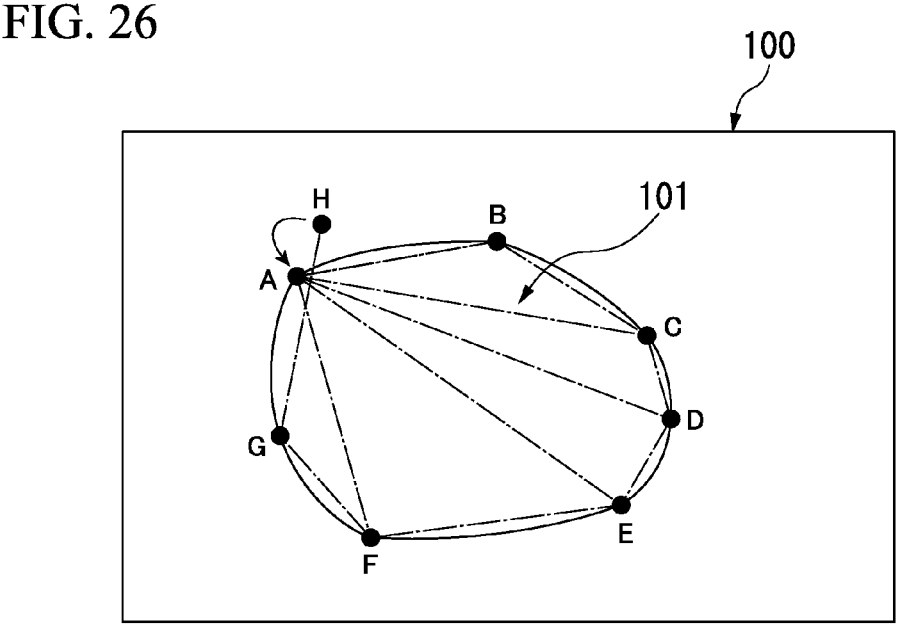
FIG. 26 is a view referentially describing how a polygon is designated in related art.

In the measuring process, first two-dimensional coordinates on the image surface of the corresponding point corresponding to the measuring point are obtained by the matching process from the two-dimensional coordinates on the image surface of the measuring point. Then, by stereo measurement using the principle of triangular survey, the three-dimensional coordinates of the measuring point are computed from the two-dimensional coordinates on the image surface of the measuring point and the corresponding point. The computed coordinates are used to compute the area and the perimetrical length. Below, a method of obtaining the three-dimensional coordinates of the measuring point by stereo measurement will be described with reference to FIG. 25. For the image imaged by the left and right optical systems, if the right direction is defined as a positive x axis, the downward direction as a positive y axis, and the direction being farther away from the optical system in parallel with the optic axis as a positive z axis, taking the center of the line segment linking the left and right optical centers 63 and 64 as an origin O by the method of triangular survey, then the three-dimensional coordinates (X, Y, Z) of the measuring point 60 are computed by formulas (1) to (3) below. the two-dimensional coordinates of the measuring point 61 and the corresponding point 62 on the left and right image surfaces implemented the distortion modification include (XL, YL) and (XR, YR), taking the intersection point OL and OR of the optic axes and the image surfaces of the respective left and right optical systems as origins, the distance between the left and right optical centers 63 and 64 is D, the focal distance is F, and t=D/(XR−XL).

$$X = t \times XR + D/2 \quad (1)$$

$$Y = -t \times YR \quad (2)$$

$$Z = t \times F \quad (3)$$

As described above, if the coordinates of the measuring point 61 and the corresponding point 62 on the image surface of the original image are determined, the three-dimensional coordinates of the measuring point 60 are obtained using parameters D and F. By obtaining the three-dimensional coordinates of several points, a variety of measurements are possible such as a distance between two points, the distance between a line linking two points and one point, area, depth, and surface shape. Further, it may obtain the distance (object distance) from the left optical center 63 or the right optical center 64 to the subject. The object distance is the distance from the front end portion 21 to the subject, and for example, it is the distance from the imaging element 28 or the observation optical system to the subject. To perform the above stereo measurement, optical data indicating the characteristics of the optical system including the front end portion 21 and the stereo optical adapter are necessary. Meanwhile, details of the matching process and the optical data will be omitted since they are described in Japanese Unexamined Patent Application, First Publication No. 2004-49638, for example.

The measuring point of the present embodiment is a vertex composing a polygon for computing the area or the perimetrical length. The measuring point of the present embodiment is any one of a moving vertex (an indeterminate point) and a determinate vertex (a determinate point). The moving vertex is the point at which the user operates the joystick installed at the operation unit 6 to input the move instructions of the vertex so as to be able to move the vertex on the image displayed on the screen of the monitor 4. Thus, the position of the moving vertex is changed depending on the operation of the joystick. The determinate vertex is the vertex at which the position is fixed until any one of the instructions of "back," "modify" and "insert vertex" is input. If the user pushes the enter button installed on the operation unit 6 to input the determine instruction of the vertex, the moving vertex is changed to a determinate vertex.

Next, the operation of the endoscope device 1 during measurement will be described. Below, the operation of the endoscope device 1 in area measurement for computing the area of a polygon will be described based on at least three measuring points. FIGS. 4 to 8 show the operation sequence of the endoscope device 1. FIGS. 9A to 9C, FIG. 10, FIG. 12 and FIGS. 14 to 16 show the images displayed on the screen of the monitor 4. FIG. 11A, FIG. 11B, FIG. 13 and FIG. 17 show an example of the contents of a vertex table to be described later.

If area measurement is selected while the endoscope device 1 is starting, the endoscope device 1 waits for the position of the first vertex (the measuring point of the first point) composing a polygon to be determined. In this state, the controller 45 first generates the two-dimensional coordinates of the moving vertex to be the first vertex (step S100). The two-dimensional coordinates are the coordinates on the image displayed on the screen of the monitor 4. In the example of the present embodiment, the two-dimensional coordinates of the initial position of the moving vertex to be the first vertex are the coordinates of the central position of the image displayed on the screen of the monitor 4.

Subsequent to step S100, the controller 45 obtains the three-dimensional coordinates corresponding to the position of the moving vertex (step S105). More specifically, in step S105, the following processing is performed. The controller 45 notifies the measuring unit 44 of the two-dimensional coordinates of the moving vertex generated in step S100. The measuring unit 44 computes the three-dimensional coordinates corresponding to the two-dimensional coordinates by the method described with reference to FIG. 25, and notifies the controller 45 of the three-dimensional coordinates. The controller 45 uses the three-dimensional coordinates computed by the measuring unit 44 as the three-dimensional coordinates of the moving vertex.

The information of the moving vertex and the determinate vertex is managed by the vertex table. The vertex table is stored in the RAM 14, and it is read properly by the controller 45 to be referred to or updated. FIG. 11A shows the contents of the vertex table when a moving vertex to be the first vertex is generated. The vertex table includes the information of the vertex number, two-dimensional coordinates, three-dimensional coordinates, class and adjacent vertexes.

The vertex number is the number given for convenience to distinguish the vertex and is given to each vertex in the sequence in which the moving vertex is generated. The "class" shows a moving vertex or determinate vertex. The "adjacent vertex" is the vertex number of the vertex that is adjacent in the polygon. Each vertex and the adjacent vertex become the points at both ends of the side composing the polygon.

When the moving vertex to be the first vertex is generated, the vertex number of the first vertex is determined as 1. As described above, the two-dimensional coordinates are the coordinates of the center position of the image displayed on the screen of the monitor 4. The three-dimensional coordinates are those obtained in step S105. In addition, the class is the moving vertex, and the adjacent vertex does not exist.

Subsequent to step S105, the controller 45 updates the image displayed on the screen of the monitor 4 (step S110). More specifically, in step S110 the following processing is performed. The controller 45 notifies the graphic image generating unit 43 of the instruction for generating a graphic image signal for displaying the pointing cursor at the position of the moving vertex and the display position of the pointing cursor (the two-dimensional coordinates of the moving vertex). The graphic image generating unit 43 generates the graphic image signals for displaying the pointing cursor at the notified display position and outputs them to the display signal generating unit 46. The display signal generating unit 46 synthesizes the video signal generated by the video signal generating unit 41 and the graphic image signal generated by the graphic image generating unit 43 for generating the display signals and outputs the generated display signals to the monitor 4. The monitor 4 displays the image based on the display signals. At this time, the object distance to be the indication of the degree of measurement precision may be displayed on the image.

Figure 9A:
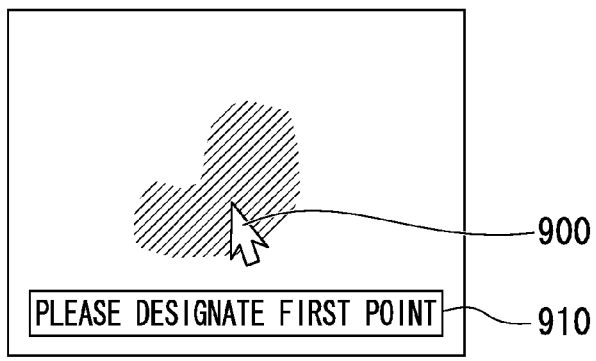
FIG. 9A is a view referentially showing an image displayed on a screen of a monitor included in the endoscope device according to the first embodiment of the present invention.

FIG. 9A shows the image displayed on the screen of the monitor 4 immediately after the moving vertex to be the first vertex is generated. The pointing cursor 900 is displayed at the center of the screen, and a message 910 prompting the user to designate the position of the first vertex is displayed on the bottom of the screen. The pointing cursor 900 and the message 910 are included in the graphic image signal generated by the graphic image generating unit 43.

Subsequent to step S110, the controller 45 determines the number of vertexes composing the polygon (step S115) and performs the process depending on the number. If the number of vertexes is less than 3 (2 or less), the processing proceeds to step S130; if the number of vertexes is 3 or more, the processing proceeds to step S120.

In the state in which the moving vertex to be the first vertex is generated, the number of vertexes is 1, so the processing proceeds to step S130.

Subsequently, the controller 45 determines the operation performed by the user based on the operation contents notified by the operation detecting unit 42 (step S130), and performs the process depending to the operation. When the joystick is operated, the move instruction of the vertex is input. In this case, the operation detecting unit 42 computes the two-dimensional coordinates of the position display of the pointing cursor depending on the operation of the joystick, and the controller 45 updates, in the vertex table, the two-dimensional coordinates of the first vertex, which is the moving vertex, to the two-dimensional coordinates of the display position of the pointing cursor computed by the operation detecting unit 42 (step S150). Then, the processing proceeds to step S105.

Figure 9B:
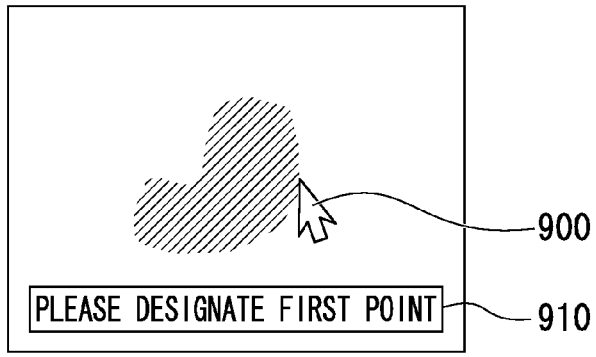
FIG. 9B is a view referentially showing an image displayed on the screen of the monitor included in the endoscope device according to the first embodiment of the present invention.

In step S105, the three-dimensional coordinates corresponding to the two-dimensional coordinates updated in step S150 are computed. Subsequently, in step S110, the pointing cursor 900 is displayed at the position that the user designated by operating the joystick on the image displayed on the screen of the monitor 4, as shown in FIG. 9B.

When the enter button is pushed in step S130, the determine instruction of the vertex is input. In this case, the controller 45 changes the class of the first vertex to the determinate vertex in the vertex table (step S145). After the class of the first vertex is changed to the determinate vertex, the endoscope device 1 waits for the position of a second vertex (the measuring point of the second point) composing a polygon to be determined. Subsequently, the processing proceeds to step S100, and the two-dimensional coordinates of the moving vertex to be the second vertex are generated. In the example of the present embodiment, the two-dimensional coordinates at the initial position of the moving vertex subsequent to the second point generated in step S100 are the two-dimensional coordinates of the vertex changed to the determinate vertex immediately before, that is, the two-dimensional coordinates at the display position of the pointing cursor.

Next, in step S105, the three-dimensional coordinates of the moving vertex to be the second vertex are computed and the vertex table is updated. FIG. 11B shows the contents of the vertex table when the moving vertex to be the second vertex is generated. The class of the first vertex is changed to the determinate vertex from the moving vertex by the processing of step S145. When the moving vertex to be the second vertex is generated, the vertex number of the second vertex is determined as 2. The class of the second vertex is the moving vertex. Because the first vertex and the second vertex are adjacent to each other, the adjacent vertex to the first vertex is the second vertex, and the adjacent vertex to the second vertex is the first vertex.

In step S110 subsequent to step S105, the image displayed on the screen of the monitor 4 is updated. At this time, the controller 45 displays the pointing cursor at the position of the moving vertex and notifies the graphic image generating unit 43 of the instruction of generating graphic image signals for displaying a predetermined mark at the position of the determinate vertex, the display position of the pointing cursor (the two dimensional coordinates of the moving vertex) and the display position of the determinate vertex (the two-dimensional coordinates of the determinate vertex). The graphic image generating unit 43 generates the graphic image signals for displaying the pointing cursor and the predetermined mark at the notified display position and outputs the generated graphic image signals to the display signal generating unit 46. Then, the process like the above-described process is performed, and the image displayed on the screen of the monitor 4 is updated.

Figure 9C:
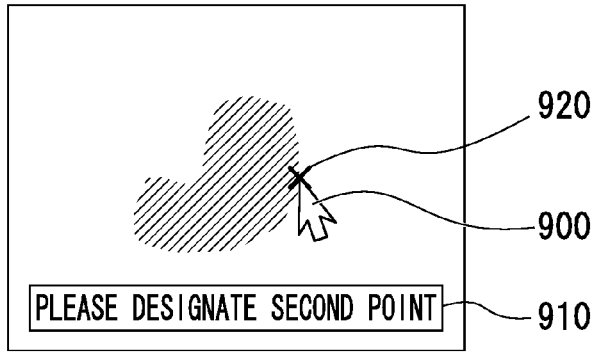
FIG. 9C is a view referentially showing an image displayed on the screen of the monitor included in the endoscope device according to the first embodiment of the present invention.

FIG. 9C shows the image displayed on the screen of the monitor 4 immediately after the moving vertex to be the second vertex is generated. When the enter button is pushed, a mark 920 of the determinate vertex is newly displayed at the position of the pointing cursor 900. Further, the content of the message 910 is updated to the content prompting the user to designate the position of the second vertex.

In step S115 subsequent to step S110, the number of vertexes is determined Because the number of vertexes is 2 in the state in which the moving vertex to be the second vertex is generated, the processing proceeds to step S130. In step S130, the operation performed by the user is determined. When the joystick is operated, the processing proceeds to step S150, and the two-dimensional coordinates of the second vertex to be the moving vertex are updated in the vertex table to the two-dimensional coordinates at the display position of the pointing cursor computed by the operation detecting unit 42.

Figure 9D:
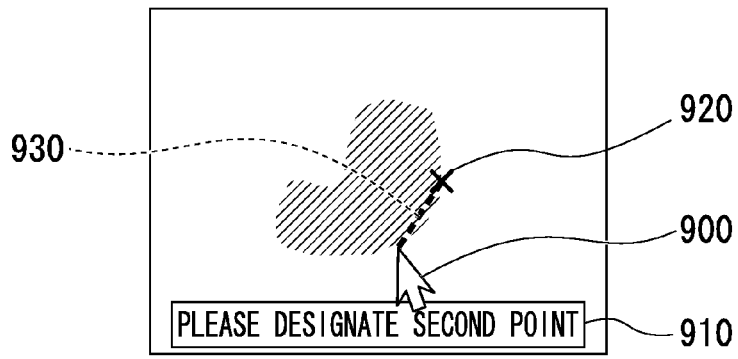
FIG. 9D is a view referentially showing an image displayed on the screen of the monitor included in the endoscope device according to the first embodiment of the present invention.

Next, in step S105, the three-dimensional coordinates corresponding to the two-dimensional coordinates updated in step S150 are computed. Then, in step S110, the pointing cursor 900 is displayed at the position designated by operating the joystick of the user, in the image displayed on the screen of the monitor 4, as shown in FIG. 9D. Further, the line segment 930 linking the respective two-dimensional coordinates of the first vertex and the second vertex in the vertex table is newly displayed. In the example of the present embodiment, the line segment linking the moving vertex and the determinate vertex is displayed with a broken line. The line segment 930 is included in the graphic image signals generated by the graphic image generating unit 43.

When the enter button is pushed in step S130, the processing proceeds to step S145, and the class of the second vertex in the vertex table is changed to a determinate vertex. After the class of the second vertex is changed to the determinate vertex, the endoscope device 1 waits for the position of a third vertex (the measuring point of the third point) composing the polygon to be determined. Subsequently, the processing proceeds to step S100, and the two-dimensional coordinates of the moving vertex to be the third vertex are generated.

Next, in step S105, the three-dimensional coordinates of the moving vertex to be the third vertex are computed, and the vertex table is updated. FIG. 11C shows the contents of the vertex table when the moving vertex to be the third vertex is generated. The class of the second vertex is changed to a determinate vertex from the moving vertex by the processing of step S150. When the moving vertex to be the third vertex is generated, the vertex number of the third vertex is determined as 3. The class of the third vertex is the moving vertex.

When three vertexes are generated, it may compose a triangle with the vertexes. In the triangle, the first vertex and the second vertex are adjacent to each other, the second vertex and the third vertex are adjacent to each other, and the third vertex and the first vertex are adjacent to each other. Therefore, the adjacent vertexes of the first vertex are the second vertex and the third vertex, the adjacent vertexes of the second vertex are the first vertex and the third vertex, and the adjacent vertexes of the third vertex are the first vertex and the second vertex.

The line segments linking the respective vertexes and the adjacent vertexes compose the sides of a polygon. For example, the adjacent vertexes of the first vertex are the second vertex and the third vertex, and the line segment linking the first vertex and the second vertex and the line segment linking the first vertex and the third vertex compose the sides of the triangle.

In step S110 subsequent to step S105, the image displayed on the screen of the monitor 4 is updated. At this time, the controller 45 displays the pointing cursor at the position of the moving vertex, and notifies the graphic image generating unit 43 of the instruction for generating graphic image signals for displaying a predetermined mark at the position of the determinate vertex, the display position of the pointing cursor (the two-dimensional coordinates of the moving vertex), and the display position of the determinate vertex (the two-dimensional coordinates of the determinate vertex). The graphic image generating unit 43 generates the graphic image signals for displaying the pointing cursor and a predetermined mark at the notified display position and outputs the generated graphic image signals to the display signal generating unit 46. Then, the same processing as the aforementioned processing is performed, and the image displayed on the screen of the monitor 4 is updated.

Figure 5:
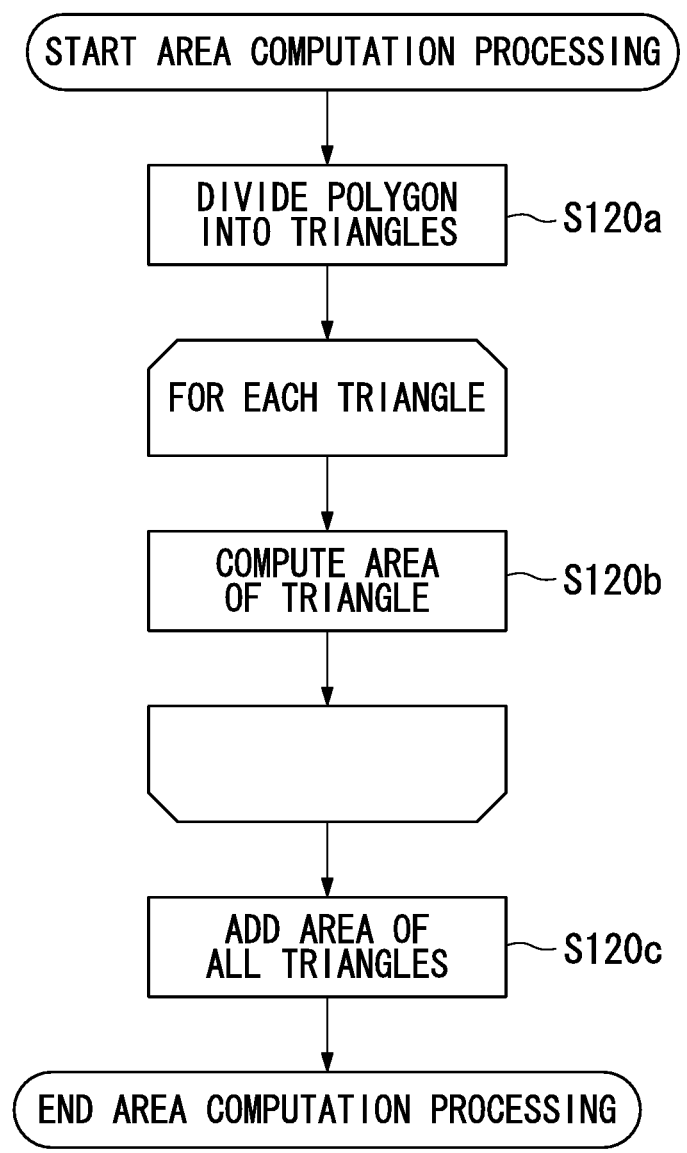
FIG. 5 is a flow chart showing an operation procedure of the endoscope device according to the first embodiment of the present invention.

In step S115 subsequent to step S110, the number of vertexes is determined. Because the number of vertexes is 3 in the state in which the moving vertex to be the third vertex is generated, the processing proceeds to step S120. Subsequently, the controller 45 controls the measuring unit 44 to compute the area of the polygon, and performs the area computation processing for obtaining the computation results (step S120). FIG. 5 shows the sequence of the area computation processing.

First, the controller 45 notifies the measuring unit 44 of the instruction for computing the area of the polygon. The measuring unit 44 finds the positional relationship of the respective vertexes composing the polygon and divides the polygon into a plurality of triangles (step S120a) based on the vertex table. For example, when n (n≥3) vertexes are generated, the polygon is divided such that a triangle is composed with the first vertex, the kth (2≤k≤n) vertex and the k+1th vertex. If the number of vertexes generated is 3, the polygon is a triangle, so division of the polygon is not performed.

Subsequent to step S120a, the measuring unit 44 computes the area of each of the divided triangles (step S120b). More specifically, in step S120b, the measuring unit 44 computes the lengths of the sides of the triangle a, b and c from the three-dimensional coordinates of the respective vertexes, and computes the area S of the triangle by formula (4) (Heron's formula) and formula (5) below.

After computing the areas of all the triangles in step S120b, the measuring unit 44 adds the areas of all the triangles to compute the area of the polygon, and notifies the controller 45 of the computation results (step S120c). If the generated number of vertexes is 3, the area computed in step S120b becomes the area of the polygon (the triangle) as it is. When the processing of step S120c ends, the area computation processing ends.

Subsequent to step S120, the controller 45 displays the area of the polygon on the screen of the monitor 4 (step S125). More specifically, the following processing is performed in step S125.

The controller 45 notifies the graphic image generating unit 43 of the instruction for generating graphic image signals for displaying the message including the computation results of the area of the polygon and the computation results of the area of the polygon computed in step S120. The graphic image generating unit 43 generates graphic image signals for displaying the message including the notified computation results and outputs the generated graphic image signals to the display signal generating unit 46. Then, the same processing as the aforementioned processing is performed, and the image displayed on the screen of the monitor 4 is updated.

Figure 10A:
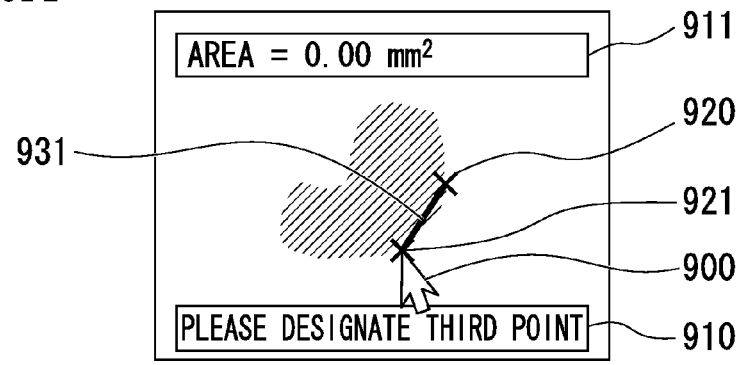
FIG. 10A is a view referentially showing an image displayed on the screen of the monitor included in the endoscope device according to the first embodiment of the present invention.

FIG. 10A shows the image displayed on the screen of the monitor 4 immediately after the moving vertex to be the third vertex is generated and the area of the polygon is computed. When the enter button is pushed, a new mark 921 of the determinate vertex is displayed at the position of the pointing cursor 900.

In addition, the contents of the message 910 are updated to the contents prompting the user to designate the position of the third vertex. Further, a message 911 showing the computation results of the area of the polygon is newly displayed on the top of the screen. After the moving vertex to be the third vertex is generated, the area of the polygon until the pointing cursor 900 moves is 0. Furthermore, the line segment 930 linking the first vertex and the second vertex in the vertex table is updated to a line segment 931. In the example of the present embodiment, the line segments linking the determinate vertexes are shown with a solid line. The mark 921, the message 911, and the line segment 931 are included in the graphic image signals generated by the graphic image generating unit 43.

When the processing of step S125 ends, the processing proceeds to step S130. In step S130, the operation performed by the user is determined. When the joystick is operated, the processing proceeds to step S150, and in the vertex table, the two-dimensional coordinates of the third vertex that is the moving vertex are updated to the two-dimensional coordinates of the display position of the pointing cursor computed by the operation detecting unit 42.

Figure 10B:
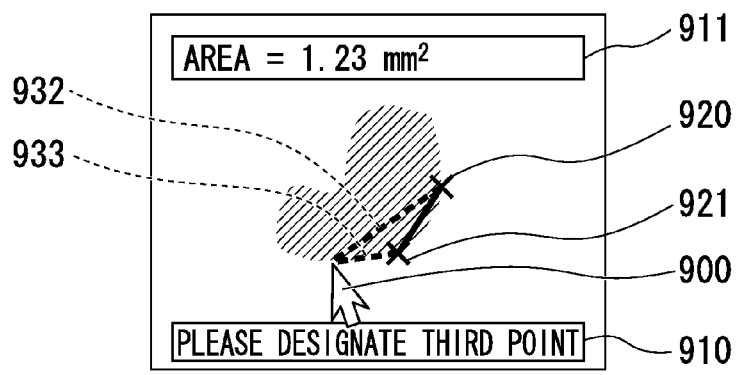
FIG. 10B is a view referentially showing an image displayed on the screen of the monitor included in the endoscope device according to the first embodiment of the present invention.

Next, in step S105, the three-dimensional coordinates corresponding to the two-dimensional coordinates updated in step S150 are computed, and in step S110, the image displayed on the screen of the monitor 4 is updated. Subsequently, after the number of vertexes is determined in step S115, the area of the polygon is computed in step S120. Next, in step S125, as shown in FIG. 10B, the computation results of the area of the polygon in the message 911 are updated in the image displayed on the screen of the monitor 4. Further, the line segment 932 linking the respective two-dimensional coordinates of the first vertex and the third vertex in the vertex table and the line segment 933 linking the respective two-dimensional coordinates of the second vertex and the third vertex in the vertex table are newly displayed. The line segments 932 and 933 are included in the graphic image signals generated by the graphic image generating unit 43.

When the enter button is pushed in step S130, the processing proceeds to step S145, and the class of the third vertex in the vertex table is changed to a determinate vertex. After the class of the third vertex is changed to the determinate vertex, the endoscope device 1 waits for the position of a fourth vertex (the measuring point of the fourth point) composing a polygon to be determined. Subsequently, the processing proceeds to step S100, and the two-dimensional coordinates of the moving vertex to be the fourth vertex are generated. Then, the same processing as the aforementioned processing is performed.

FIG. 11D shows the contents of the vertex table when the moving vertex to be the fourth vertex is generated. The class of the third vertex is changed to a determinate vertex from the moving vertex by the processing of step S150. When the moving vertex to be the fourth vertex is generated, the vertex number of the fourth vertex is determined as 4. The class of the fourth vertex is the moving vertex. Further, the adjacent vertexes of the fourth vertex are the third vertex and the first vertex.

As the moving vertex to be the fourth vertex is generated, the adjacent vertexes of the other respective vertexes are changed. For example, before the moving vertex to be the fourth vertex is generated, the adjacent vertexes of the first vertex are the second vertex and the third vertex, but when the moving vertex to be the fourth vertex is generated, the adjacent vertex of the first vertex is changed from the third vertex to the fourth vertex. Further, before the moving vertex to be the fourth vertex is generated, the adjacent vertexes of the third vertex are the second vertex and the first vertex, but when the moving vertex to be the fourth vertex is generated, the adjacent vertex of the third vertex is changed from the first vertex to the fourth vertex.

Figure 10C:
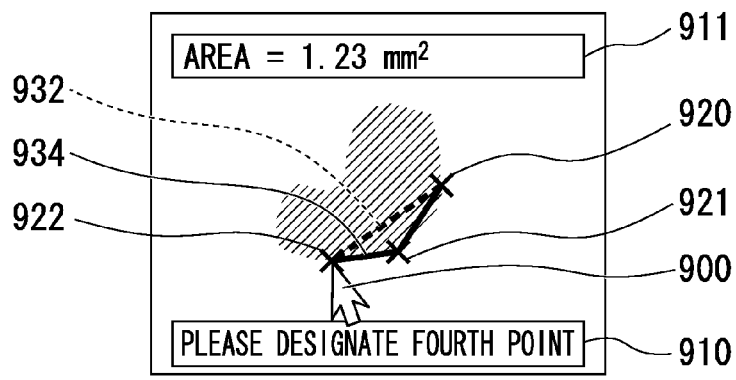
FIG. 10C is a view referentially showing an image displayed on the screen of the monitor included in the endoscope device according to the first embodiment of the present invention.

FIG. 10C shows the image displayed on the screen of the monitor 4 immediately after the moving vertex to be the fourth vertex is generated. When the enter button is pushed, a mark 922 of the determinate vertex is newly displayed at the position of the pointing cursor 900. The content of the message 910 is changed to content prompting the user to designate a fourth vertex. Further, the line segment 933 linking the respective two-dimensional coordinates of the second vertex and the third vertex in the vertex table is updated to a line segment 934. The mark 922 and the line segment 934 are included in the graphic image signals generated by the graphic image generating unit 43.

Figure 10D:
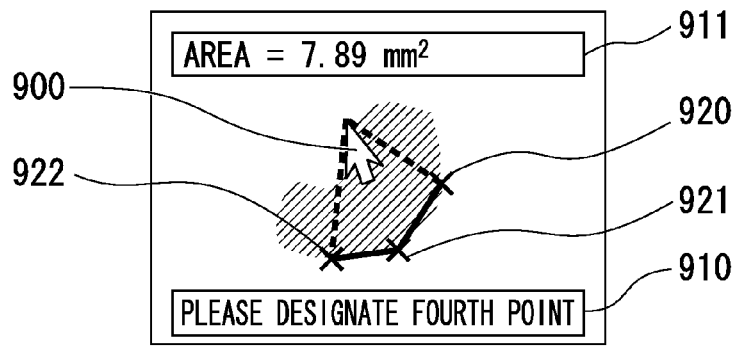
FIG. 10D is a view referentially showing an image displayed on the screen of the monitor included in the endoscope device according to the first embodiment of the present invention.

FIG. 10D shows the image displayed on the screen of the monitor 4 immediately after the pointing cursor showing the position of the moving vertex to be the fourth vertex moves and the area of the polygon is computed.

The pointing cursor 900 is displayed at the position that the user designated by operating the joystick, and the computation results of the area of the polygon in the message 911 are updated.

In the above process, when the moving vertex contacts the sides composing the polygon, the moving range of the pointing cursor may be limited so that the moving vertex does not go over the contacted sides.

Therefore, it may keep the sides of the polygon from crossing.

In the above processing, when the user performs the operation of determining the vertex (the pushing of the enter button), a new moving vertex is generated at the position of the vertex that is changed to a determinate vertex (the position of the pointing cursor), but the position at which the moving vertex is generated may be a different position. For example, the position at which the moving vertex is generated may be a position of a determinate vertex other than the determinate vertex that was last changed to a determinate vertex, or may be the position of the center of the side including the determinate vertex that was last changed to a determinate vertex, or the position deviating by a predetermined distance from the position of the determinate vertex that was last changed to a determinate vertex.

As described above, the computation results of the area of the polygon composed of the moving vertexes and determinates vertexes are displayed, and the computation results of the area of the polygon are updated according to the movement of the moving vertex. Therefore, it is not necessary for the user to perform an operation of closing the polygon, and it is possible to perform the measurement more simply. For example, in the case of conducting inspection for determining PASS/FAIL of the turbine blade by whether the measurement results have exceeded a threshold value by measuring the area of the burnt region on the surface of the aircraft engine turbine blade and comparing the measurement results with the threshold value, the endoscope device of the present embodiment is convenient. For example, the user approximately designates a smaller polygon than the burnt region with a small number of measuring points and compares the area obtained at that point of time with the threshold value. If the area exceeds the threshold value, it is possible to determine the turbine blade FAIL right away at that stage. Accordingly, it is possible to shorten the inspection time.

In step S130, when the menu button installed on the operation unit 6 is pushed, the display instruction of the menu is input. In this case, the controller 45 displays the menu on the screen of the monitor 4 (step S135). More specifically, in step S135 the following processing is performed. The controller 45 notifies the graphic image generating unit 43 of the instruction for generating the graphic image signals for displaying the menu. The graphic image generating unit 43 generates the graphic image signals for displaying the menu and outputs them to the display signal generating unit 46. Then, the same processing as the aforementioned processing is performed, and as the image displayed on the screen of the monitor 4 is updated, a new menu is displayed.

Subsequent to step S135, the controller 45 determines the operation the user is performing based on the operation content of the joystick notified of by the operation detecting unit 42 (step S140) and perform the processing according to the operation. When the "back" is selected from the menu, the execution instruction of the back processing is input. In this case, the controller 45 controls to perform the back processing to be described later (step S155). When the "modify" is selected from the menu, the execution instruction of the modification processing is input. In this case, the controller 45 performs the modification processing to be described later (step S160). When the "insert vertex" is selected from the menu, the execution instruction of the vertex insertion processing is input. In this case, the controller 45 performs the vertex insertion processing to be described later (step S165).

When the "determine shape" is selected from the menu, the instruction for determining the shape of the polygon is input. In this case, the controller 45 determines the number of vertexes composing the polygon and performs the processing according to the number (step S170). If the number of vertexes is less than three (two or less), the processing proceeds to step S130; whereas if the number of vertexes is three or more, the processing proceeds to step S175.

If the number of vertexes is three or more, the controller 45 changes the moving vertex to a determinate vertex, and displays the area of the polygon on the screen of the monitor 4 (step S175). More specifically, in step S175 the following processing is performed. The controller 45 displays a message including the computation results of the area of the polygon, and notifies the graphic image generating unit 43 of the instruction for generating the graphic image signals for displaying a predetermined mark at the position of the determinate vertex, the computation results of the area of the polygon computed in step S120, and the display position of the determinate vertex (the two-dimensional coordinates of the determinate vertex). The graphic image generating unit 43 displays a message including the notified computation results, and generates the graphic image signals for displaying a predetermined mark at the notified display position and outputs them to the display signal generating unit 46. Then, the same processing as the aforementioned processing is performed, and the image displayed on the screen of the monitor 4 is updated. After the image is updated in step S175, the displayed area is not changed even if the user moves the pointing cursor by operating the joystick.

For example, in the case of conducting inspection for determining in detail PASS/NG of the aircraft engine turbine blade, the user designates a polygon with a number of measuring points to the extent that the burnt region of the surface of the turbine blade can be approximated, determines the shape of the polygon, and compares the area with the threshold value. Therefore, it may execute inspection with a high degree of precision.

Next, the back processing performed in step S155 will be described in detail. The back processing is a processing for returning the vertex that has last become a determinate vertex to a moving vertex. Below, the back processing will be described in detail, taking the case of returning to the moving vertex the determinate vertex that becomes a fourth vertex as an example.

Figure 12A:
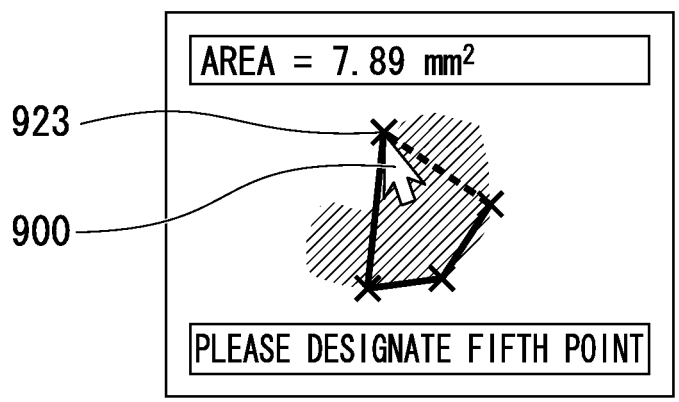
FIG. 12A is a view referentially showing an image displayed on the screen of the monitor included in the endoscope device according to the first embodiment of the present invention.
Figure 12B:
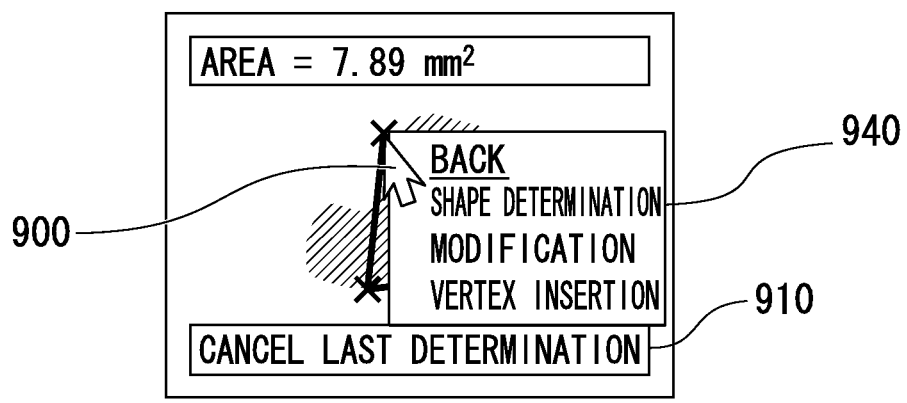
FIG. 12B is a view referentially showing an image displayed on the screen of the monitor included in the endoscope device according to the first embodiment of the present invention.

FIG. 12A shows an image displayed on the screen of the monitor 4 immediately after a moving vertex to be the fifth vertex is generated. When the enter button is pushed, a new mark 923 of the determinate vertex is displayed at the position of the pointing cursor 900. FIG. 12B shows an image displayed on the screen of the monitor 4 when the menu button is pushed. When the menu button is pushed, a new menu 940 is displayed at the position of the pointing cursor 900. Further, the content of the message 910 is changed to the content of the back processing.

The menu 940 is included in the graphic image signals generated by the graphic image generating unit 43. In the menu 940, the respective characters of "back," "determine shape," "modify," and "insert vertex" are displayed. When the menu 940 is displayed, "back" is highlighted (emphasized display). When the user operates the joystick, the pointing cursor 900 moves and the highlighted characters are changed. When the user pushes the enter button with the "back" highlighted, the back processing is performed.

Figure 6:
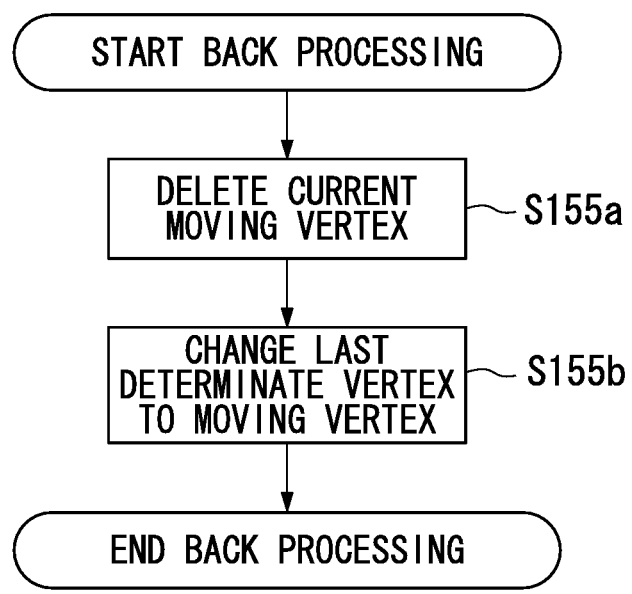
FIG. 6 is a flow chart showing an operation procedure of the endoscope device according to the first embodiment of the present invention.

FIG. 6 shows the sequence of the back processing. First the controller 45 deletes the information of the moving vertex from the vertex table (step S155*a*). FIG. 13A shows the contents of the vertex table at the time when the moving vertex to be a fifth vertex is generated. The class of the fourth vertex is changed from the moving vertex to the determinate vertex. Further, information on the fifth vertex is added, and the adjacent vertexes of each vertex are updated. FIG. 13B shows the contents of the vertex table at the time when the processing of step S155*a* is performed. The information of the fifth vertex is deleted in the processing of step S155*a*.

With the fifth vertex deleted, the adjacent vertexes of each vertex are updated. For example, before the fifth vertex is deleted, the adjacent vertexes of the first vertex are the fifth vertex and the second vertex, but after the fifth vertex is deleted, the adjacent vertex of the first vertex is changed from the fifth vertex to the fourth vertex. Further, before the fifth vertex is deleted, the adjacent vertexes of the fourth vertex are the third vertex and the fifth vertex, but after the fifth vertex is deleted, the adjacent vertex of the fourth vertex is changed from the fifth vertex to the first vertex.

Subsequent to step S155*a*, the controller 45 changes the class of the vertex that has last become a determinate vertex to a moving vertex in the vertex table (step S155*b*). By the processing of step S155*b*, the vertex table becomes as shown in FIG. 11D. The class of the fourth vertex that has last become a determinate vertex is changed from the determinate vertex to a moving vertex.

When the processing of step S155*b* ends, the back processing ends. After the ending of the back processing, the processing proceeds to step S105. At the point of time at which the back processing ends, the endoscope device 1 begins waiting for the position of the fourth vertex (the measuring point of the fourth point) composing a polygon to be determined, and the display position of the pointing cursor is changed in the back processing to the position of the fourth vertex that is changed from the determinate vertex to the moving vertex. In step S110 immediately after the back processing ends, the image displayed on the screen of the monitor 4 becomes as shown in FIG. 10D.

As described above, by performing the back processing, it may back the vertex that has last become a determinate vertex to the moving vertex and designate the vertex again.

Next, the modification processing performed in step S160 will be described in detail. The modification processing is processing for changing the selected determinate vertex to a moving vertex in order to modify the position of the determinate vertex. Below, the modification processing will be described in detail by taking the case of modifying the position of any determinate vertex after the moving vertex to be the fourth vertex becomes a determinate vertex and a moving vertex to be the fifth vertex is generated as an example.

Figure 14A:
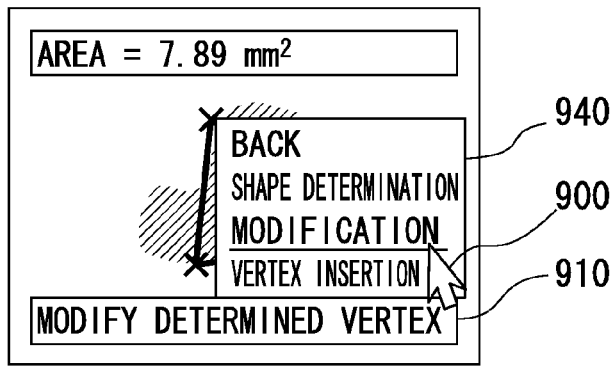
FIG. 14A is a view referentially showing an image displayed on the screen of the monitor included in the endoscope device according to the first embodiment of the present invention.

FIG. 14A shows an image displayed on the screen of the monitor 4 after the menu button is pushed. When "modify" is highlighted by operation of the joystick after the menu button is pushed to display the menu 940, the contents of the message 910 are changed to the contents of the modification processing. If the user pushes the enter button with the "modify" highlighted, the modification processing is performed.

Figure 7:
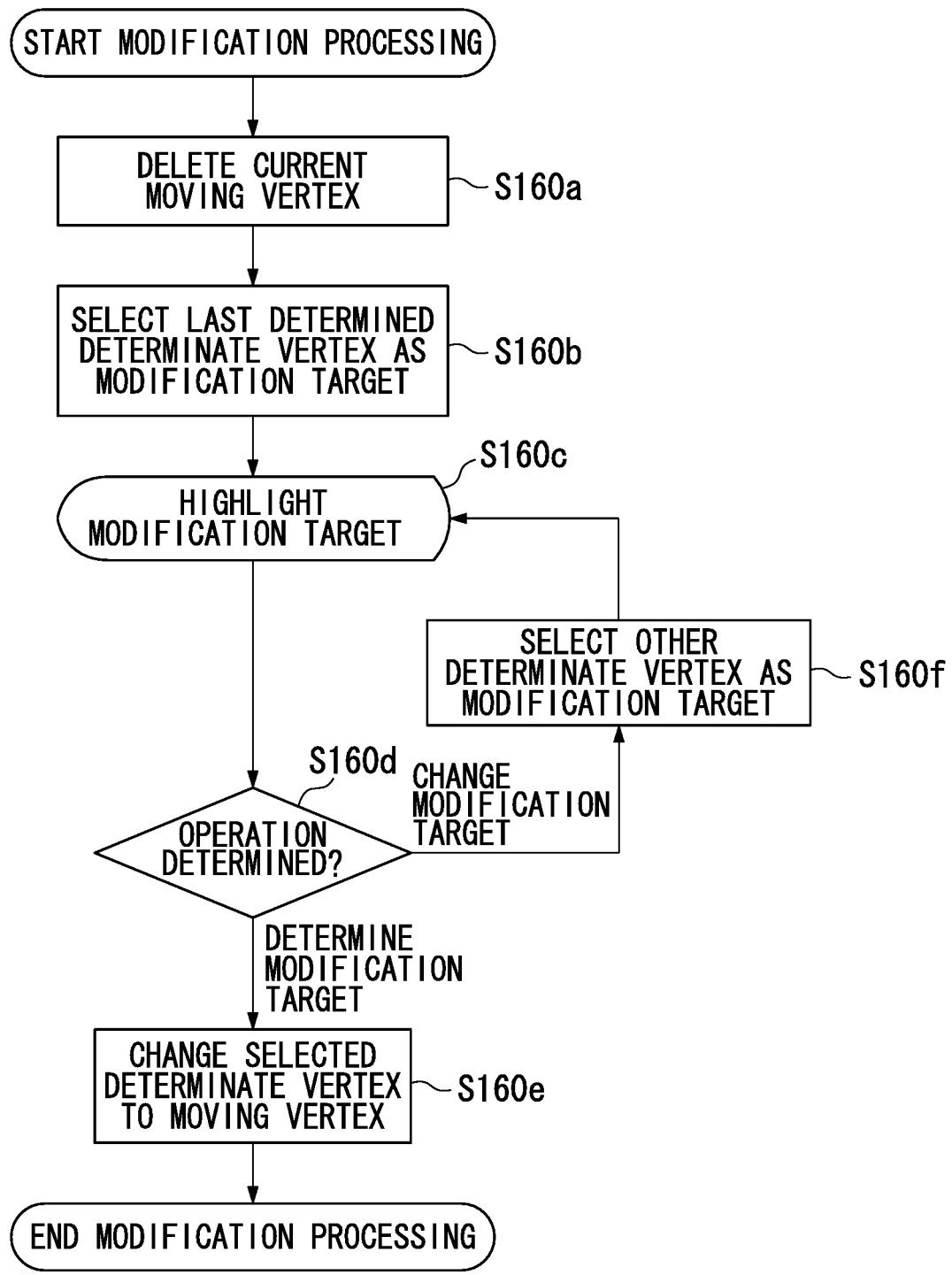
FIG. 7 is a flow chart showing an operation procedure of the endoscope device according to the first embodiment of the present invention.

FIG. 7 shows the sequence of modification processing. First, the controller 45 deletes the information of the moving vertex from the vertex table (step S160*a*).

The contents of the vertex table when a moving vertex to be the fifth vertex is generated are as shown in FIG. 13A. Further, the contents of the vertex table when the processing of step S160*a* is performed becomes as shown in FIG. 13B.

Subsequent to step S160*a*, the controller 45 controls to select the vertex that has become a determinate vertex at the last as the modification target from the vertex table (step S160*b*). Subsequently, the controller 45 highlights the determinate vertex to be modified in the image displayed on the screen of the monitor 4 (step S160*c*).

Figure 14B:
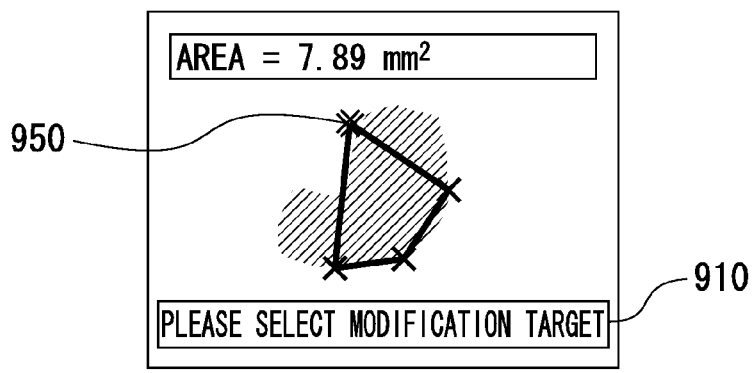
FIG. 14B is a view referentially showing an image displayed on the screen of the monitor included in the endoscope device according to the first embodiment of the present invention.

More specifically, the following processing is performed in step S160*c*. The controller 45 notifies the graphic image generating unit 43 of the instruction for generating graphic image signals for highlighting the determinate vertex selected as the modification target and the display position of the determinate vertex (the two-dimensional coordinates of the determinate vertex) to be highlighted. The graphic image generating unit 43 generates the graphic image signals for displaying a predetermined mark at the notified display position and outputs them to the display signal generating unit 46. Then, the same processing as the aforementioned processing is performed, and the image displayed on the screen of the monitor 4 is updated. FIG. 14B shows the image displayed on the screen of the monitor 4 when the enter button is pushed with the "modify" highlighted on the menu. At the position of the determinate vertex that has last become a determinate vertex, a mark 950 distinguishing the determinate vertex from other determinate vertexes is displayed. Further, the content of the message 910 is changed to the content prompting the user to select the vertex to be modified.

Subsequent to step S160*c*, the controller 45 determines the operation performed by the user based on the operation content notified of by the operation detecting unit 42 (step S160*d*), and performs the processing depending on the operation. When the joystick is operated, the change instruction of the modification target is input. In this case, the controller 45 Subsequent to select the vertex other than the last highlighted vertex as the modification target (step S160*f*).

Figure 14C:
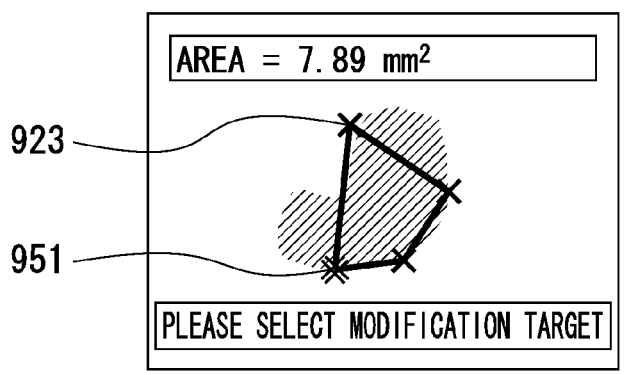
FIG. 14C is a view referentially showing an image displayed on the screen of the monitor included in the endoscope device according to the first embodiment of the present invention.

Subsequently, the processing proceeds to step S160*c*. In step S160*c*, the display form of the determinate vertex that was the modification target before the modification target was changed returns to the original state, and the determinate vertex that becomes a modification target after the modification target is changed is highlighted. FIG. 14C shows the image displayed on the screen of the monitor 4 after the modification target is changed. At the position of the determinate vertex that was the modification target before the modification target was changed, a mark 923 like a determinate vertex that is not a modification target is displayed; and at the position of the determinate vertex that has become a new modification target, a mark 951 for distinguishing the determinate vertex from other determinate vertexes is displayed.

When the enter button is operated in step S160*d*, the instruction for determining the modification target is input. In this case, the controller 45 changes the class of the determinate vertex of the modification target to a moving vertex (step S160*e*). For example, when the fourth vertex is selected as a modification target, the vertex table after change becomes as shown in FIG. 11D, and the class of the fourth vertex is changed to a moving vertex.

As the processing of step S160e ends, the modification processing ends. After the ending of the modification processing, the processing proceeds to step S105. At the point of time at which the modification processing ends, the endoscope device 1 begins waiting for the position of the fourth vertex (the measuring point of the fourth point) composing a polygon to be determined, and the display position of the pointing cursor is changed to the position of the fourth vertex that is changed from the determinate vertex to a moving vertex by the modification processing. In step S110 immediately after the modification processing ends, the image displayed on the screen of the monitor 4 becomes as shown in FIG. 10D.

As described above, by performing the modification processing, it is possible to return any determinate vertex to the moving vertex and designate the vertex again. Next, the vertex insertion processing performed in step S165 will be described in detail. The vertex insertion processing is processing for inserting the moving vertex into the selected side and changing the side of the polygon. Below, the vertex insertion processing will be described in detail taking the case of inserting a moving vertex into any side after a moving vertex to be the fourth vertex becomes a determinate vertex and a moving vertex to be the fifth vertex is generated as an example.

Figure 15A:
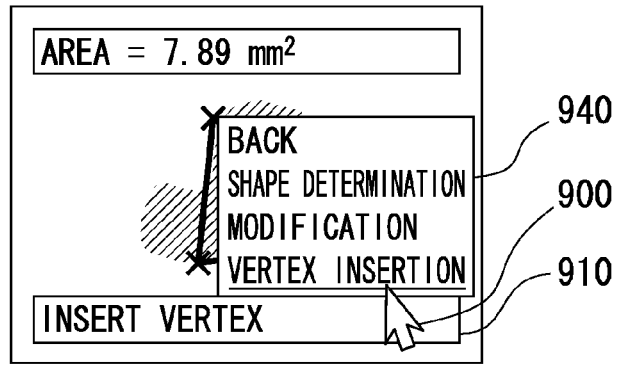
FIG. 15A is a view referentially showing an image displayed on the screen of the monitor included in the endoscope device according to the first embodiment of the present invention.

FIG. 15A shows the image displayed on the screen of the monitor 4 after the menu button is pushed. After the menu button is pushed to display the menu 940, the content of the message 910 is changed to the content of the vertex insertion processing, when the "insert vertex" is highlighted by the operation of the joystick. When the user pushes the enter button with the "insert vertex" highlighted, the vertex insertion processing is performed.

Figure 8:
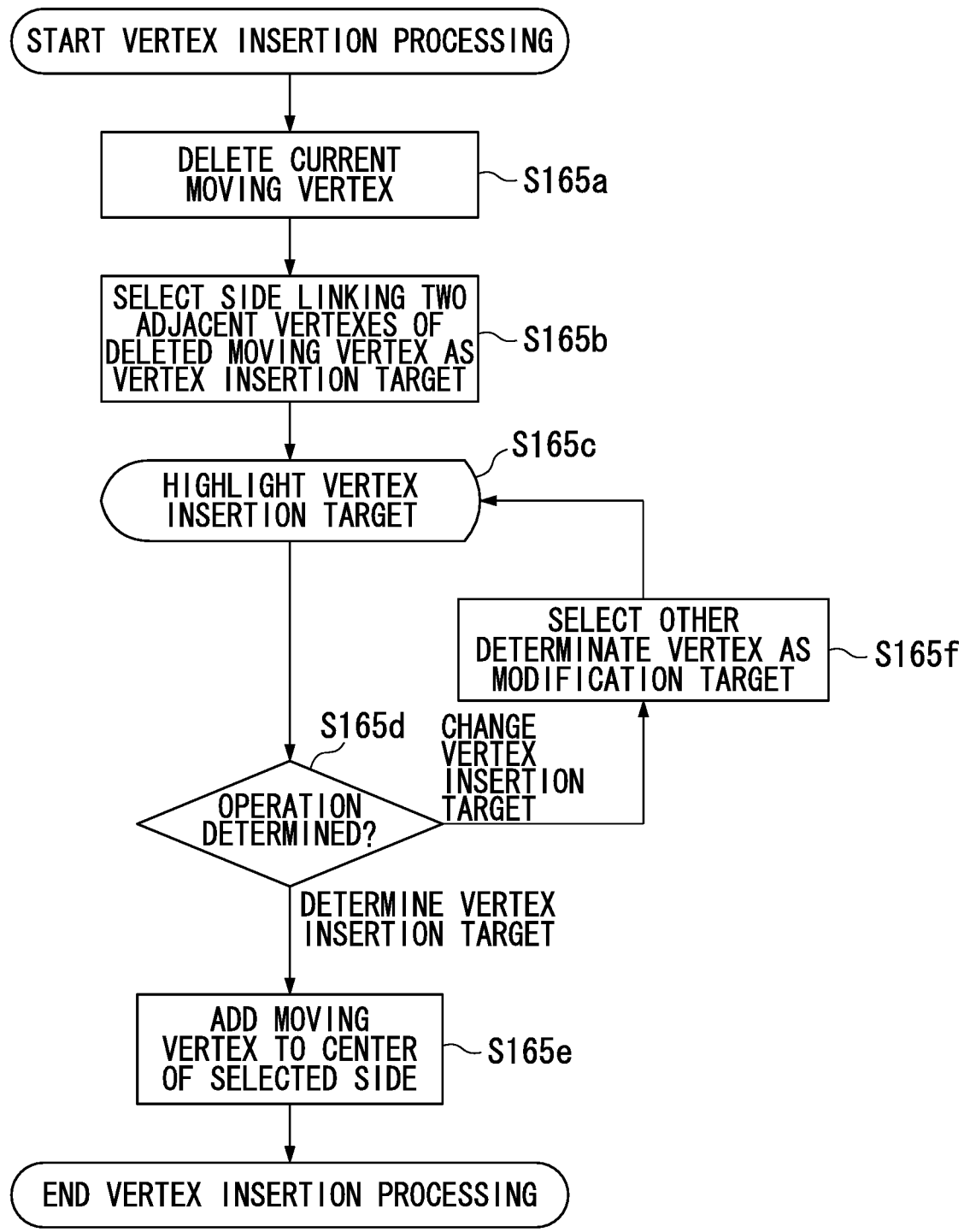
FIG. 8 is a flow chart showing an operation procedure of the endoscope device according to the first embodiment of the present invention.

FIG. 8 shows the sequence of the vertex insertion processing. First, the controller 45 deletes the information of the moving vertex from the vertex table (step S165a).

FIG. 13A shows the contents of the vertex table at the time when a moving vertex to be the fifth vertex is generated. Further, the contents of the vertex table at the time when the processing of step S165a is performed are as shown in FIG. 13B. Subsequent to step S165a, the controller 45 selects the side linking two adjacent vertexes of the moving vertex deleted in step S165a as the vertex insertion target from the vertex table (step S165b). Subsequently, the controller 45 highlights the side of the vertex insertion target on the image displayed on the screen of the monitor 4 (step S165c).

More specifically, the following processing is performed in step S165e, The controller 45 notifies the graphic image generating unit 43 of the instruction for generating the graphic image signals for highlighting the side selected as the vertex insertion target and the display position of the highlighted side (the two-dimensional coordinates of two determinate vertexes composing the side). The graphic image generating unit 43 generates the graphic image signals for displaying the side in a predetermined display form at the notified display position and outputs the generated graphic image signals to the display signal generating unit 46. Then, the same processing as the aforementioned processing is performed, and the image displayed on the screen of the monitor 4 is updated.

Figure 15B:
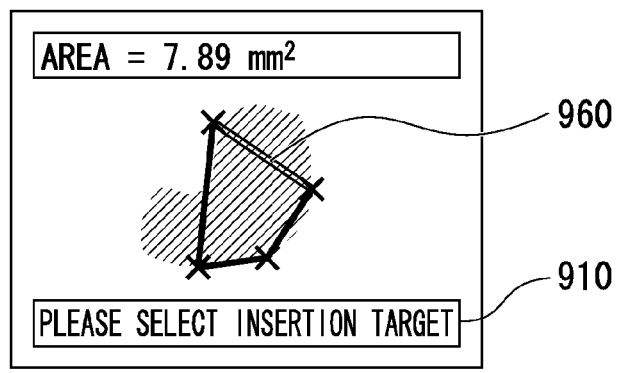
FIG. 15B is a view referentially showing an image displayed on the screen of the monitor included in the endoscope device according to the first embodiment of the present invention.

FIG. 15B shows the image displayed on the screen of the monitor 4 when the enter button is pushed with the "insert vertex" highlighted on the menu. Since the information of the fifth vertex is deleted from the vertex table in step S165a, the side 960 linking the first vertex and the fourth vertex that are the adjacent vertexes of the fifth vertex is highlighted. Further, the content of the message 910 is changed to the content prompting the user to select the side of the vertex insertion target.

Subsequent to step S165c, the controller 45 determines the operation the user is performing based on the operation content notified by the operation detecting unit 42 (step S165d) and performs the processing depending on the operation. When the joystick is operated, the change instruction of the vertex insertion target is input. In this case, the controller 45 selects the side other than the last highlighted side as the vertex insertion target (step S165f).

Subsequently, the processing proceeds to step S165c. In step S165c, the display form of the side that was the vertex insertion target before the vertex insertion target was changed returns to the original state, and the side that has become the vertex insertion target after the vertex insertion target was changed is highlighted.

Figure 15C:
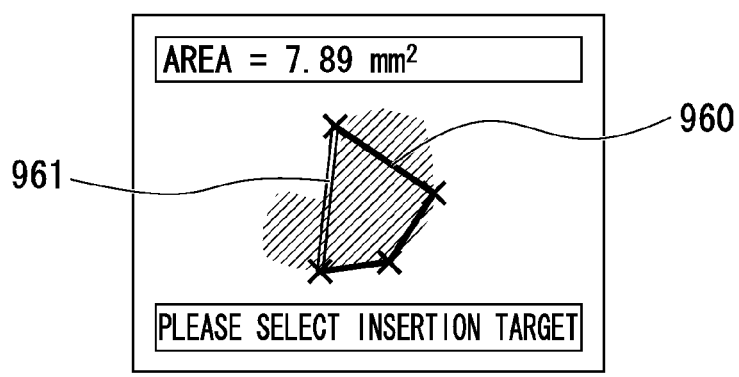
FIG. 15C is a view referentially showing an image displayed on the screen of the monitor included in the endoscope device according to the first embodiment of the present invention.

FIG. 15C shows the image displayed on the screen of the monitor 4 after the vertex insertion target is changed. The side 960 that was the vertex insertion target before the vertex insertion target was changed is displayed as a line segment of the same class as the side other than the vertex insertion target, and the side 961 that has become a vertex insertion target is highlighted, newly.

When the enter button is operated in step S165d, the instruction for determining the vertex insertion target is input. In this case, the controller 45 adds a moving vertex to the center of the side of the vertex insertion target in the vertex table (step S165e).

FIG. 17 shows the contents of the vertex table at the time at which the moving vertex to be the fifth vertex is added to the center of the side linking the third vertex and the fourth vertex. The information on the fifth vertex is added to the vertex table. The two-dimensional coordinates of the fifth vertex are the two-dimensional coordinates of the center of the side linking the third vertex and the fourth vertex. The three-dimensional coordinates of the fifth vertex are computed when the processing of step S105 is performed initially after the vertex insertion processing ends, and the computed values are recorded in the vertex table. The class of the fifth vertex is a moving vertex, and the adjacent vertexes are the third vertex and the fourth vertex.

With the fifth vertex is added, the adjacent vertexes of each vertex are updated. For example, before the fifth vertex is added, the adjacent vertexes of the third vertex are the second vertex and the fourth vertex, but after the fifth vertex is added, the adjacent vertex of the third vertex is changed from the fourth vertex to the fifth vertex. Further, before the fifth vertex is added, the adjacent vertexes of the fourth vertex are the third vertex and the first vertex, but after the fifth vertex is added, the adjacent vertex of the fourth vertex is changed from the third vertex to the fifth vertex.

As the processing of step S165e ends, the vertex insertion processing ends. After the vertex insertion processing ends, the processing proceeds to step S105. At the point of time at which the vertex insertion processing ends, the endoscope device 1 begins waiting for the position of the fifth vertex (the measuring point of the fifth point) composing the polygon to be determined, and the display position of the pointing cursor is changed to the position of the moving vertex added by the vertex insertion processing.

With the fifth vertex added, the side composing the polygon is changed in the image displayed in the monitor 4. The side including the third vertex and the fourth vertex that was displayed before the fifth vertex was added is deleted, and the side including the third vertex and the fifth vertex and the side including the fourth vertex and the fifth vertex are displayed.

FIG. 16A shows the image displayed on the screen of the monitor 4 immediately after the moving vertex to be the fifth vertex is generated. The pointing cursor 900 is displayed at the position of the center of the side linking the third vertex and the fourth vertex. Further, the content of the message 910 is changed to the content prompting the user to designate the position of the fifth vertex. Further, the side 961 is deleted, and a line segment 935 linking the respective two-dimensional coordinates of the third vertex and the fifth vertex and a line segment 936 linking the respective two-dimensional coordinates of the fourth vertex and the fifth vertex are displayed.

FIG. 16B shows the image displayed on the screen of the monitor 4 immediately after the pointing cursor showing the position of the moving vertex to be the fifth vertex moves and the area of the polygon is computed.

The pointing cursor 900 is displayed at the position designated by operating the joystick by the user, and the computation results of the area of the polygon in the message 911 are updated.

In the above processing, a new moving vertex is added to the center of the side that has become the vertex insertion target, but the position at which the moving vertex is added need not be the position on the side. For example, the position at which a moving vertex is added is the position near the vertex included in the side that has become the vertex insertion target, and may also be a position that is not on the side that has become the vertex insertion target.

As described above, by performing the vertex insertion processing, it may add a moving vertex to any side composing the polygon and designate the vertex again.

In the present embodiment, the area of the polygon is computed, but the perimetrical length may be computed by adding the lengths of all the sides composing the polygon. Computation of the perimetrical length may be performed in step S120 of FIG. 4. For example, the controller 45 notifies the measuring unit 44 of the instruction for computing the perimetrical length of the polygon. The measuring unit 44 computes the lengths of the respective sides by finding the respective sides composing the polygon based on the vertex table and computing the lengths between the three-dimensional coordinates of two vertexes composing the respective sides. Subsequently, the measuring unit 44 computes the perimetrical length by adding the lengths of the respective sides and notifies the controller 45 of the computation results. In the present embodiment, only one of the area and the perimetrical length of the polygon may be computed, or both of the area and the perimetrical length of the polygon may be computed.

In addition, in the present embodiment, the three-dimensional coordinates of the vertexes composing the polygon are obtained by stereo measurement, but the three-dimensional coordinates may be obtained by a fringe projection method, for example, which uses parallel fringes made of the light portions and dark portions, or by a distance image sensor which adopts the TOF method using an infrared light.

Further, in the present embodiment, the three-dimensional coordinates are obtained when the two-dimensional coordinates of the moving vertex are updated, but the three-dimensional coordinates corresponding to all points in the image may be computed and stored when obtaining the image or starting the area measurement.

Furthermore, the pointing device of the present embodiment includes the joystick, enter button and menu button, but it may be other types of pointing devices such as a mouse, a touch panel and a tablet. When using the mouse, the determining operation by the enter button may be substituted with a left button click, for example.

As described above, according to the present embodiment, both the area and the perimetrical length of the polygon, or one of the area and the perimetrical length of the polygon are computed and both the area and the perimetrical length of the polygon, or one of the area and the perimetrical length of the polygon are displayed. Then, if an instruction for moving the vertex is input through the operation unit 6, the position of the moving vertex, which is an indeterminate point, is updated, and both the area and the perimetrical length of the polygon, or one of the area and the perimetrical length of the polygon are computed and the computation results are displayed. Therefore, it may obtain the measurement results even without the necessity of the operation of closing a polygon, so measurement can be performed more simply.

In addition, in the present embodiment, by performing any one of the back processing, modification processing and vertex insertion processing, it may change the determinate vertex to a moving vertex or add a new moving vertex, and it may not be necessary to designate the vertex again from the beginning. Accordingly, it may proceed with the work efficiently, for example, in the case of changing the position of the vertex or increasing the number of vertexes by designating the polygon to confirm the area, in order to improve the degree of measuring precision, after the user designates a polygon with a small number of vertexes to confirm the area at the screening stage for making a rough determination of PASS/FAIL on the item to be inspected.

(Modified Embodiment)

Figure 18:
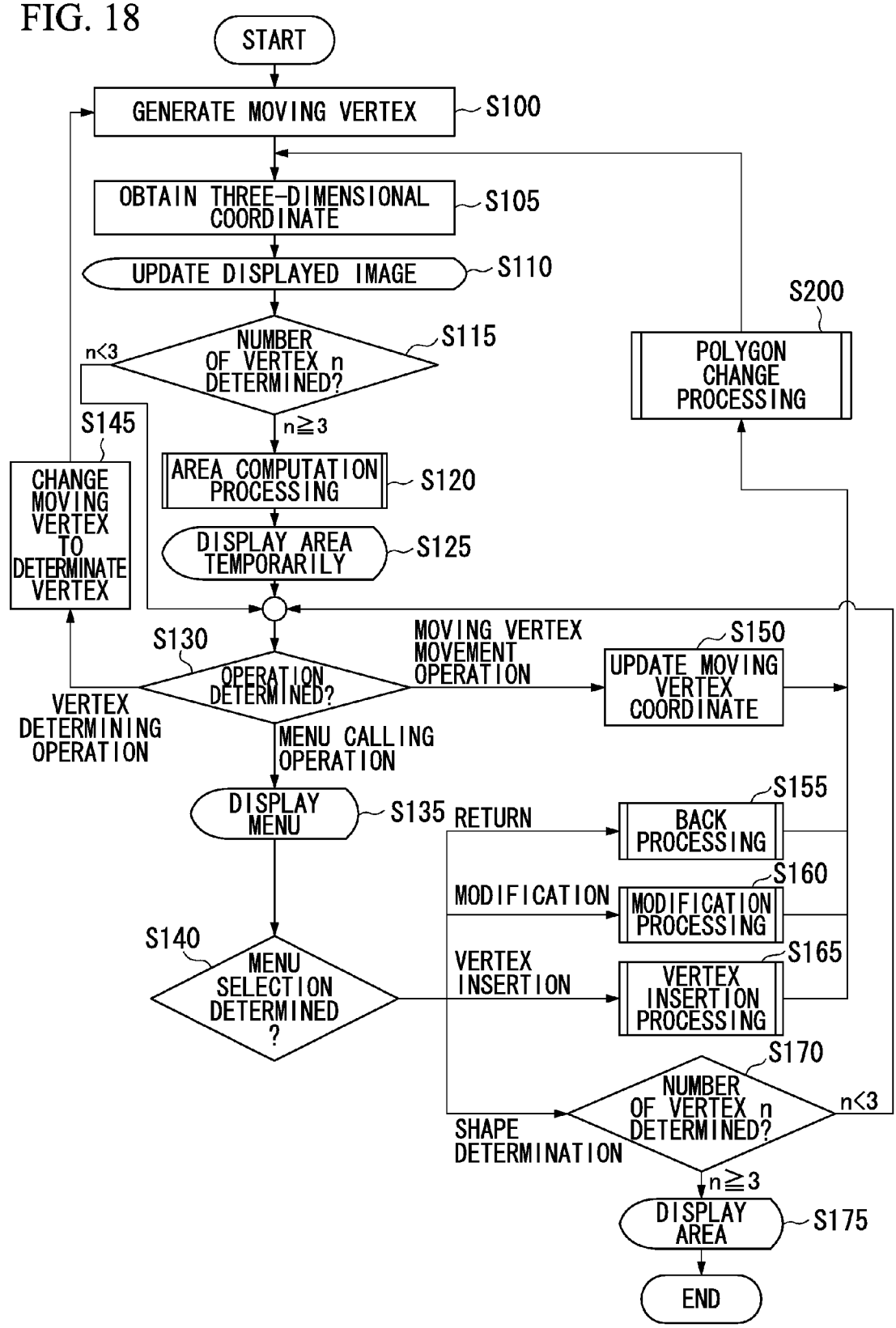
FIG. 18 is a flow chart showing an operation procedure of the endoscope device according to the first embodiment of the present invention.

Next, a modified example of the present embodiment will be described. FIG. 18 shows a modified example of FIG. 4. In FIG. 18, polygon change processing (step S200) is performed after the ending of the processes of steps S150, S155, S160 and S165. During the movement of a moving vertex, when at least one of two sides including the moving vertex crosses another side, the configuration of the polygon is changed in the polygon change processing.

Figure 19A:
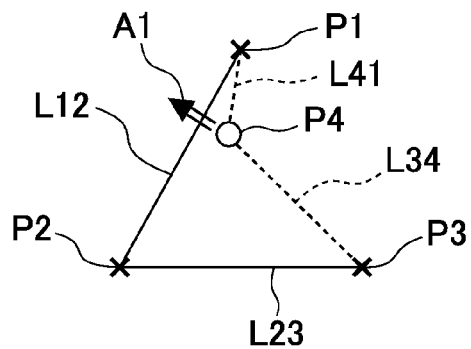
FIG. 19A is a view showing an overview of a polygon change processing in the first embodiment of the present invention.

FIGS. 19A, 19B, 19C and 19D show an overview of the polygon change processing. As shown in FIG. 19A, after vertexes P1, P2 and P3 are designated in sequence and each of the vertexes becomes a determinate vertex from the moving vertex, vertex P4, which is a moving vertex, is generated. The side L12 including vertexes P1 and P2, the side L23 including vertexes P2 and P3, the side L34 including vertexes P3 and P4, and the side L41 including vertexes P4 and P1 are as shown in FIG. 19A. The vertex P4 is moving in the direction shown with arrow A1.

Figure 19B:
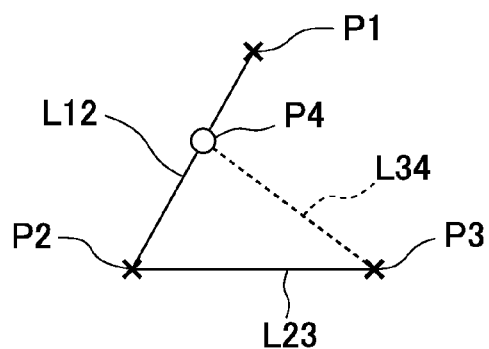
FIG. 19B is a view showing the overview of the polygon change processing in the first embodiment of the present invention.
Figure 19C:
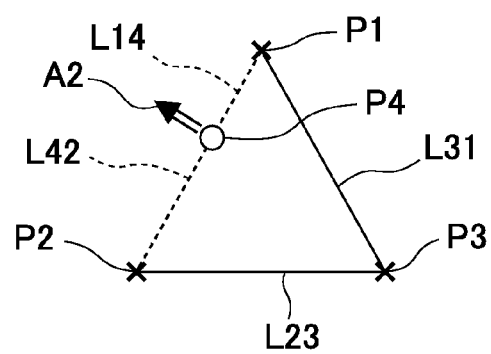
FIG. 19C is a view showing the overview of the polygon change processing in the first embodiment of the present invention.
Figure 19D:
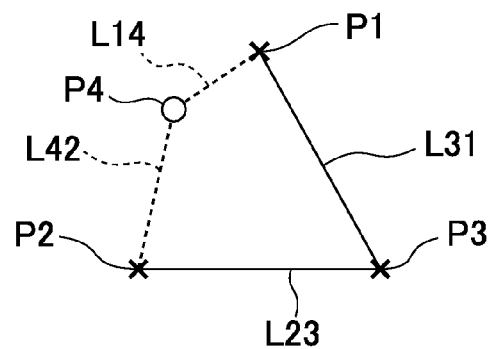
FIG. 19D is a view showing the overview of the polygon change processing in the first embodiment of the present invention.

FIG. 19B shows the state in which vertex P4 has moved onto side L12. At this time, of the sides L34 and L41 that include the vertex P4, the side L34 crosses the side L12. If the side L34 and the side L12 cross each other, the crossed side L12 and the sides L34 and L41 that include the point P4 are deleted, and as shown in FIG. 19C, the side L31 that includes the vertexes P3 and P1 that were the adjacent vertexes of the vertex P4, and the sides L14 and L42 that include the vertexes P1, P2 and P4 included in the side L12 that is crossed with the side that includes the vertex P4 of the deleted side, are generated. If the vertex P4 moves in the direction shown with arrow A2, the respective vertexes and the respective sides become as shown in FIG. 19D.

The state of the polygon after the polygon change processing shown in FIGS. 19A, 19B, 19C and 19D is performed is the same as the state of the polygon at the time at which the moving vertex that was between the vertexes P1 and P3 is deleted and a new moving vertex is generated between the vertexes P1 and P2. That is, it may change the state of the polygon to the state identical to the state of the polygon at the time at which the aforementioned vertex insertion processing is performed. In the polygon change processing, it may insert a vertex more simply since the vertex insertion is automatically executed by the movement of the moving vertex. In FIG.

18, the vertex insertion processing (step S165) is provided, but in the case of performing the polygon change processing instead, the vertex insertion processing need not be performed.

Below, the vertex insertion processing will be described in detail, taking the case in which the polygon change processing shown in FIGS. 19A, 19B, 19C and 19D is performed as an example. In the following description, a side table for managing the state of each side is used as an example. The side table is stored in a RAM 14, and it is properly read, referred to and updated by the controller 45.

Figure 20:
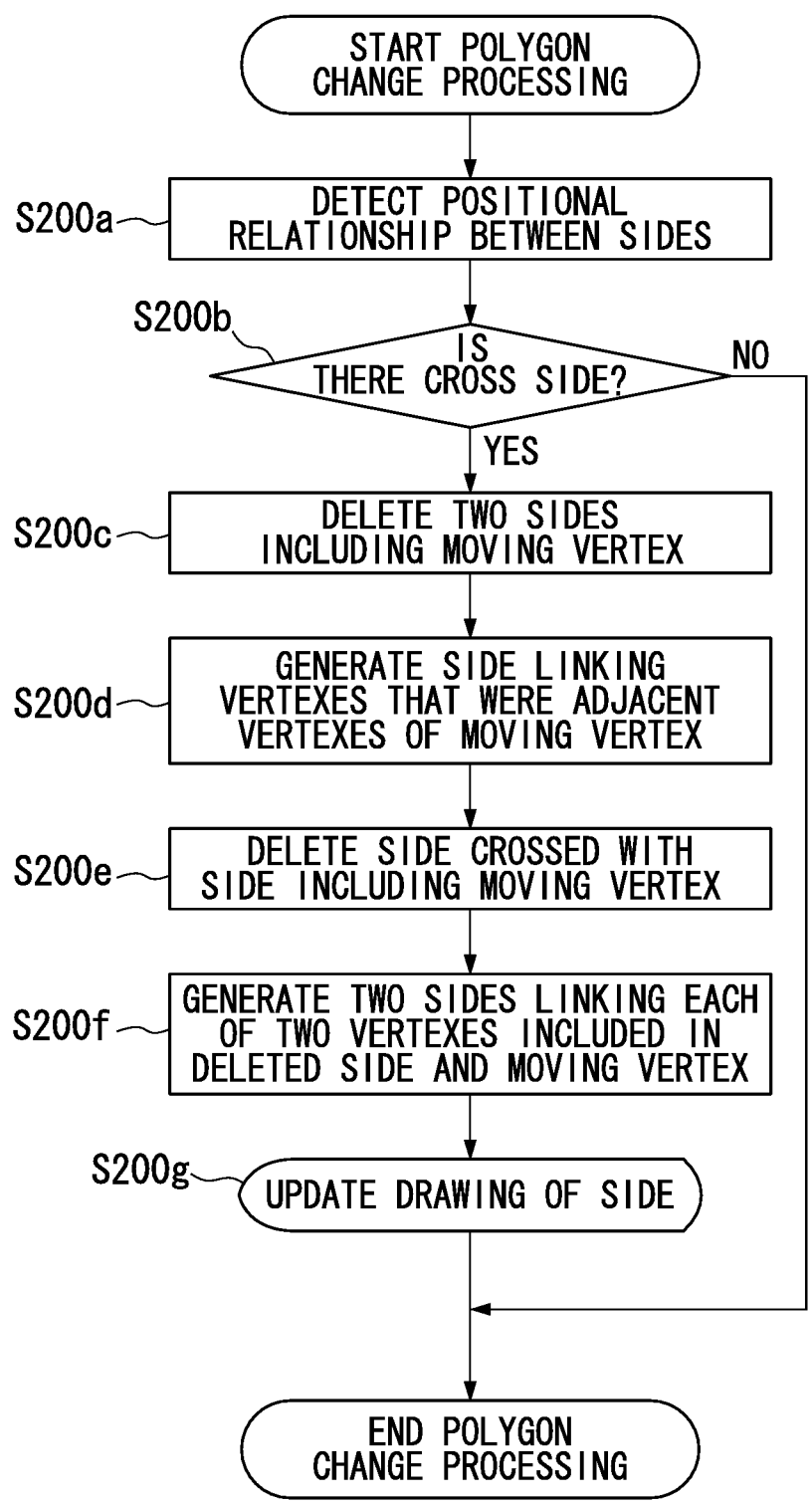
FIG. 20 is a flow chart showing an operation procedure of the endoscope device according to the first embodiment of the present invention.

FIG. 20 shows the sequence of the polygon change processing. First, the controller 45 recognizes the respective sides composing the polygon based on the vertex table and detects the positional relationship between the side including the moving vertex and the other side (step S200a). Since the information on the adjacent vertexes of each vertex is recorded in the vertex table, it may recognize the respective sides composing the polygon based on the information. For example, in the vertex table shown in FIG. 11D, the adjacent vertexes of the fourth vertex, which is a moving vertex, are the third vertex and the first vertex. Therefore, the sides composing the polygon are the side including the fourth vertex and the third vertex and the side including the fourth vertex and the first vertex. Likewise, it may recognize other sides from the information of the adjacent vertexes of other vertexes.

In step S200a, a formula of a straight-line is computed for each side, and whether the side including a moving vertex crosses the other side is determined. In step S200a, it may be determined whether the line segment that links the position before the moving vertex moves and the position after it has moved crosses each of the other sides that do not include a moving vertex. If the processing of step S200a is performed, it may obtain the determination results on whether each side that does not include the moving vertex crosses the side that includes the moving vertex.

Subsequent to step S200a, the controller 45 determines whether there is any other side that crosses the side that includes a moving vertex by referring to the processing results of step S200a (step S200b).

If there is no other side that crosses the side including a moving vertex, the polygon change processing ends. After the ending of the polygon change processing, the processing proceeds to step S105. If there is any other side that crosses the side including a moving vertex, the controller 45 deletes the information of the two sides that include moving vertexes from the side table (step S200c).

FIGS. 21A, 21B, 21C, 21D and 21E show an example of the contents of the side table. FIG. 21A shows the contents of the side table at the beginning of the polygon change processing. The side table has information on each of the side number and included vertexes. The side number is a number given for convenience to distinguish the sides and is given to each side in the order of being generated. In FIG. 21, to make it easy to understand the description, the symbol of each side in FIG. 19 is shown with the side number. The included vertexes are the vertex numbers of the two vertexes included in each side. For example, the side with the number L12 includes two vertexes (the first vertex and the second vertex) with the vertex numbers 1 and 2. As shown in FIG. 19B, when the sides L34 and L41 including a moving vertex P4 cross the side L12, in step S200c the information of sides L34 and L41 is deleted from the moving table as shown in FIG. 21B.

Subsequent to step S200c, the controller 45 generates a side linking two vertexes that were the adjacent vertexes of the moving vertex (step S200d). As shown in FIG. 19B, when the sides L34 and L41 that include the moving vertex P4 cross the side L12, the adjacent vertexes of the moving vertex P4 are vertexes P3 and P1. Therefore, the side L31 of FIG. 19C is generated, and as shown in FIG. 21C, information on the side L31 linking the vertexes P3 and P1 is added to the side table.

Subsequent to step S200d, the controller 45 deletes the side which is crossed by the side including the moving vertex (step S200e). As shown in FIG. 19B, when the sides L34 and L41 that include the moving vertex P4 cross the side L12, the information on the side L12 is deleted from the side table, as shown in FIG. 21D.

Subsequent to step S200e, the controller 45 generates two sides respectively linking the two vertexes included in the side deleted in step S200e and the moving vertex (step S200f). As shown in FIG. 19B, when the sides L34 and L41 that include the moving vertex P4 cross the side L12, the side L12 is deleted in step S200e, so the sides L14 and L42 respectively linking the vertexes P1 and P2 included in the deleted side and the vertex P4 are generated, as shown in FIG. 19C. Further, as shown in FIG. 21C, the information on sides L14 and L42 is added to the side table.

In the polygon change processing, there is a case in which the adjacent vertexes of each vertex are changed by deletion and generation of sides. Thus, the controller 45 updates the vertex table appropriately. For example, it may recognize the adjacent vertexes of each vertex from the side table after the processing of step S200f ends. In addition, it is possible in FIG. 21C to know that the adjacent vertexes of the third vertex are the second vertex and the first vertex from the fact that the second vertex and the third vertex are included in side L23 and the third vertex and the first vertex are included in side L31. The controller 45 updates the vertex table based on the information of the adjacent vertexes recognized in such a way as described above.

Subsequent to step S200f, the controller 45 notifies the graphic image generating unit 43 of the instruction for generating graphic image signals for displaying the side generated in step S200f and the display position of each side (the two-dimensional coordinates of the two determinate vertexes composing each side), while not displaying the side deleted in step S200c. The graphic image generating unit 43 generates the graphic image signals for displaying the side in a predetermined display form at the notified display position and outputs them to the display signal generating unit 46. Then, the same processing as the aforementioned processing is performed, and the image displayed on the screen of the monitor 4 is updated.

(Second Embodiment)

Next, the second embodiment of the present invention will be described. In the present embodiment, the monitor 4 has a touch panel as a pointing device. With the endoscope device 1 waiting for the position of the vertexes composing the polygon to be determined, the moving vertex and the pointing cursor move to the position tapped on the touch panel by the user. By the processing described in the first embodiment, whenever the moving vertex moves, the area (or the perimetrical length) of the polygon is computed and the computation results are displayed.

When the user taps the decide icon on the screen of the monitor 4, the determine instruction of the vertex is input, so the moving vertex is changed to a determinate vertex and a new moving vertex is generated. Further, if the user performs a double tap (pushing two times) or a long tap (pushing long) on the screen of the monitor 4, the processing such as the vertex insertion processing or the modification processing described in the first embodiment is performed.

If the distance between the two-dimensional coordinates of the position at which the double tap is performed and the side that includes two determinate vertexes is within 10 pixels, for example, a moving vertex is inserted in the center of the side by the processing such as the vertex insertion processing described in the first embodiment. Further, when another position is tapped, the moving vertex moves to that position. However, when there are a plurality of sides in which the distance to the two-dimensional coordinates of the position double-tapped is within 10 pixels, the side with a shorter distance should become the vertex insertion target. When there are a plurality of sides in which the distance to the two-dimensional coordinates of the double-tapped position becomes the same distance within 10 pixels, the side generated earlier becomes the vertex insertion target. The two-dimensional coordinates of the double-tapped position and the threshold value of the distance to the side (10 pixels in the present embodiment) are changeable.

Figure 22A:
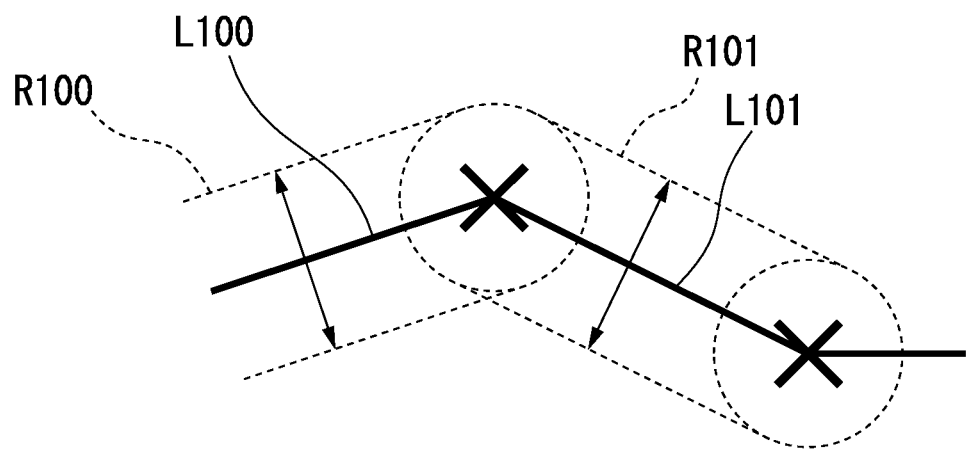
FIG. 22A is a view referentially describing a concept of a processing in a second embodiment of the present invention.

As shown in FIG. 22A, when a double tap is performed in the region R100 (the region enclosed by a broken line) in which the distance to the side L100 composing the polygon is within 10 pixels, a moving vertex is inserted in the center of the side L100. Likewise, when a double tap is performed in the region R101 (the region enclosed by a broken line) in which the distance to the side L101 composing the polygon is within 10 pixels, a moving vertex is inserted in the center of the side L101. Further, when a double tap is performed in the region (the region of the portion in which region R100 and region R101 overlap) in which the distance to both of side L100 and side L101 is within 10 pixels, a moving vertex is inserted in the center of the side closer to the two-dimensional coordinates of the double-tapped position between the side L100 and the side L101.

Figure 22B:
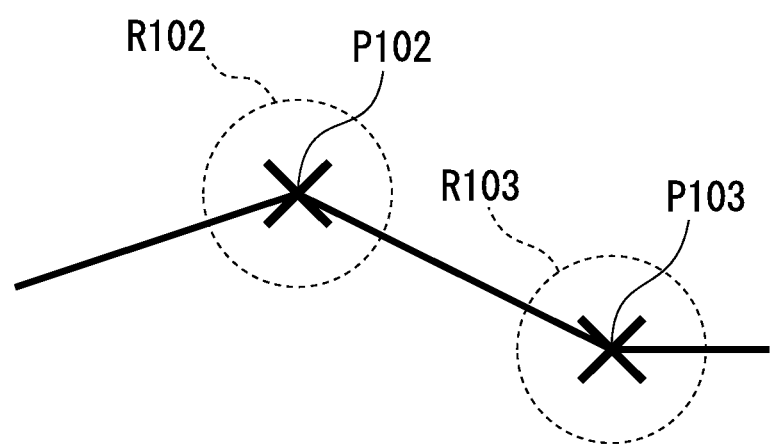
FIG. 22B is a view referentially describing the concept of the processing in the second embodiment of the present invention.

In addition, if the distance between the two-dimensional coordinates of the long-tapped position and the determinate vertex is within 10 pixels, for example, the determinate vertex is changed to a moving vertex by the same processing as the modification processing described in the first embodiment. Further, if another position is tapped, the moving vertex moves to that position. However, if there are a plurality of determinate vertexes in which the distance to the two-dimensional coordinates of the long-tapped position is within 10 pixels, the determinate vertex with a smaller distance should become the modification target. If there are a plurality of determinate vertexes in which the distance to the two-dimensional coordinates of the long-tapped position is the same distance within 10 pixels, the earlier generated determinate vertex becomes the modification target. The threshold value (10 pixels in the present embodiment) of the distance between the two-dimensional coordinates of the long-tapped position and the determinate vertex is changeable by the set menu, etc., which is not shown, for example. As shown in FIG. 22B, when a long tap is performed in region R102 (the region enclosed by a broken line) in which the distance to the determinate vertex P102 composing the polygon is within 10 pixels, the determinate vertex P102 is changed to a moving vertex. Likewise, when a long tap is performed in region R103 (the region enclosed by a broken line) in which the distance to the determinate vertex P103 composing the polygon is within 10 pixels, the determinate vertex P103 is changed to a moving vertex.

In the above description the vertex is modified by a long tap, but the vertex may be modified by a double tap. For example, if the distance between the two-dimensional coordinates of the double-tapped position and the determinate vertex is within 10 pixels, the vertex is modified regardless of the distance between the two-dimensional coordinates of the double-tapped position and the side. By executing the operation necessary for inserting and modifying the vertex commonly, the operation becomes simpler.

The menu icon may be disposed on the screen of the monitor 4, and if the menu icon is tapped, a predetermined function may be selected from the menu as in the first embodiment.

The pointing device of the present embodiment is the touch panel, but it may be a pointing device of another type such as a mouse, a touch pad and a joystick. When using the mouse, the double tap corresponds to a double click, and a long tap corresponds to a long press of the left button.

According to the present embodiment, operation necessary for inserting or modifying a vertex can be done more simply.

(Third Embodiment)

Next, the third embodiment of the present invention will be described. In the present embodiment, the monitor 4 is provided with a multi-touch type touch panel as the pointing device. Below, the method of designating a polygon in the present embodiment will be described.

FIGS. 23 and 24 show the image displayed on the screen of the monitor 4. FIG. 23A shows the image displayed on the screen of the monitor 4 when area measurement begins. In the center of the screen, a square 970 with one side with a length of 200 pixels is displayed. The four vertexes composing the square 970 are moving vertexes. Further, a message 910 prompting the user to adjust the size of the square 970 and so on. a message 911 showing the computation results of the area of a polygon, and a decide icon 980 are displayed. The decide icon 980 is an icon for operating to change the four moving vertexes to determinate vertexes.

Figure 23A:
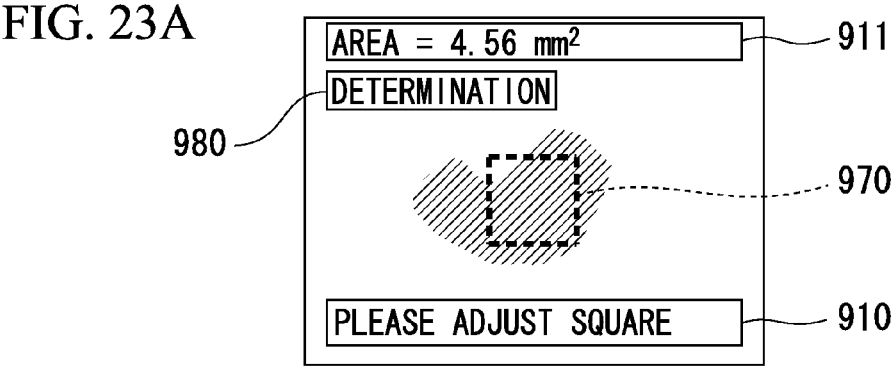
FIG. 23A is a view referentially showing an image displayed on a screen of a monitor included in an endoscope device according to a third embodiment of the present invention.
Figure 23B:
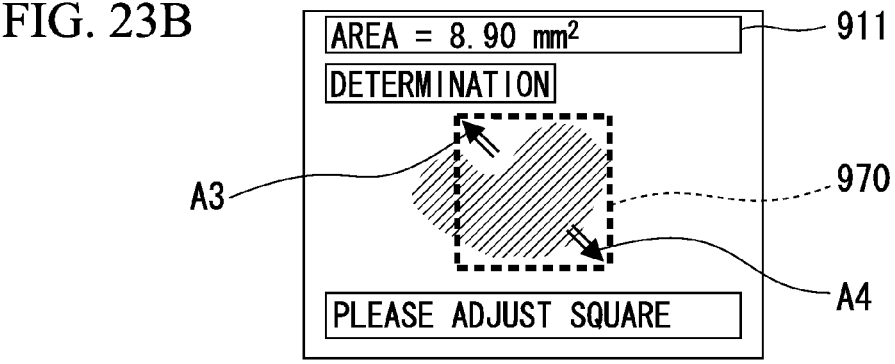
FIG. 23B is a view referentially showing an image displayed on the screen of the monitor included in the endoscope device according to the third embodiment of the present invention.

When the user operates pinch-out and/or pinch-in on the screen of the monitor 4, the square 970 is enlarged and/or reduced. FIG. 23B shows the image displayed on the screen of the monitor 4 when a pinch-out operation is performed. By performing the pinch-out operation, the instruction for moving the moving vertex so as to enlarge the square 970 is input and the square 970 is enlarged. Further, as the square 970 is enlarged, the computation results of area of the polygon in the message 911 are updated. Arrows A3 and A4 show the directions in which the square 970 is enlarged and are not displayed on the screen of the monitor 4.

Figure 23C:
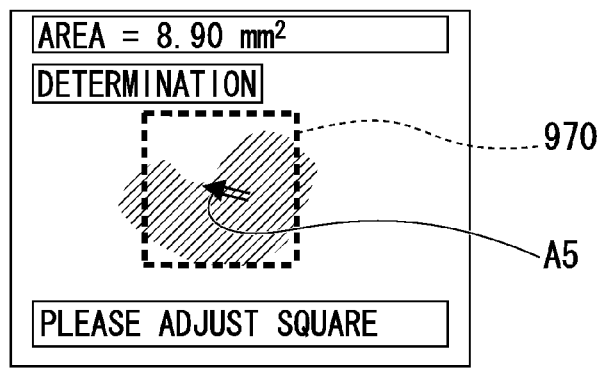
FIG. 23C is a view referentially showing an image displayed on the screen of the monitor included in the endoscope device according to the third embodiment of the present invention.

When the user operates a drag to the square 970 on the screen of the monitor 4, the square 970 moves. FIG. 23C shows the image displayed on the screen of the monitor 4 when a drag is operated. By operating a drag, the instruction for moving the moving vertex for the square 970 to move is input, so the square 970 moves. The arrow A5 shows the direction in which the square 970 moves (the direction of drag operation), and is not displayed on the screen of the monitor 4.

Figure 23D:
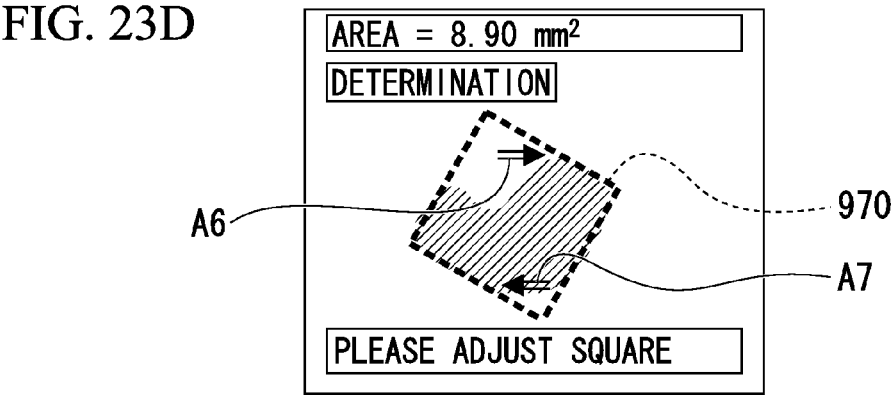
FIG. 23D is a view referentially showing an image displayed on the screen of the monitor included in the endoscope device according to the third embodiment of the present invention.

When the user operates rotation on the screen of the monitor 4, the square 970 rotates. A rotation operation is an operation of dragging two fingers in directions opposite to each other. FIG. 23D shows the image displayed on the screen of the monitor 4 when rotation is operated. By operating rotation, the instruction for moving the moving vertex for the square 970 to rotate is input, so the square 970 rotates. The arrows A6 and A7 show the directions (the directions of drag operation by two fingers) in which the square 970 rotates, and are not displayed on the screen of the monitor 4.

By performing pinch-out and pinch-in operations, a drag operation and a rotation operation in proper combination, the user may fit the square 970 displayed on the screen of the monitor 4 in the region of which the area is to be measured.

Figure 24A:
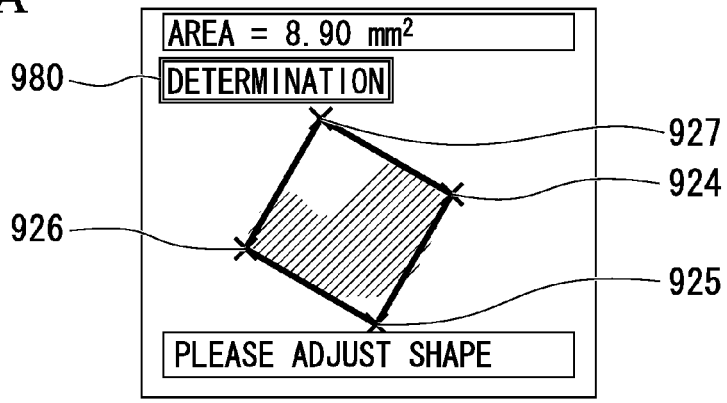
FIG. 24A is a view referentially showing an image displayed on the screen of the monitor included in the endoscope device according to the third embodiment of the present invention.

When the user taps the decide icon 980, the four moving vertexes composing the square 970 are changed to determinate vertexes. FIG. 24A shows the image displayed on the screen of the monitor 4 when the decide icon 980 is tapped. As the decide icon 980 is tapped, the instruction for determining the vertex is input, the four moving vertexes are changed to determinate vertexes, and marks 924 to 927 are displayed at the positions of determinate vertexes.

Figure 24B:
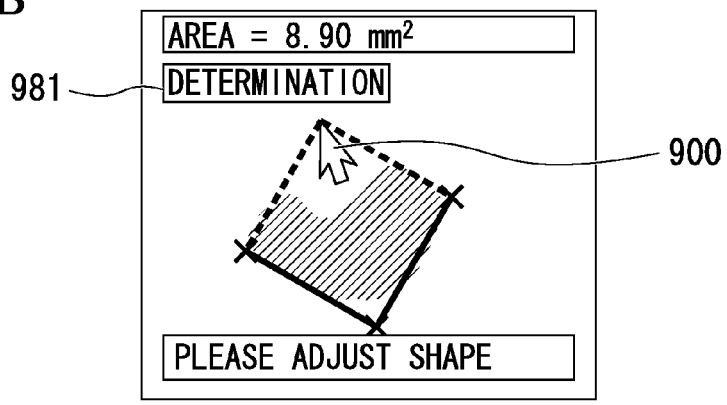
FIG. 24B is a view referentially showing an image displayed on the screen of the monitor included in the endoscope device according to the third embodiment of the present invention.
Figure 24C:
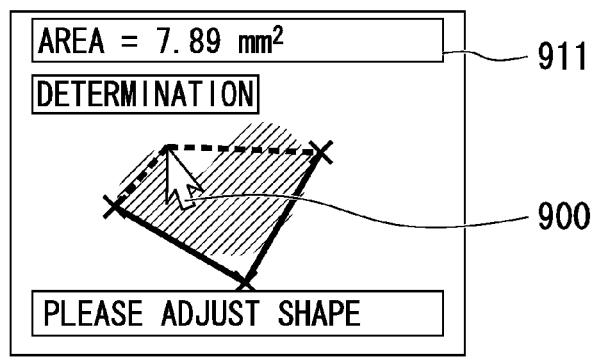
FIG. 24C is a view referentially showing an image displayed on the screen of the monitor included in the endoscope device according to the third embodiment of the present invention.

After the moving vertexes are changed to determinate vertexes, modification or insertion of vertexes is performed by the same processing as the processing described in the second embodiment and the shape of the polygon is changed. FIG. 24B shows the image displayed on the screen of the monitor 4 when a long tap is performed in the vicinity of the mark 927. When the user performs a long tap at the position near the determinate vertex, the determinate vertex is changed to a moving vertex, and a pointing cursor 900 is displayed at the position of the moving vertex. Further, instead of the decide icon 980, a determine icon 981 is displayed. Then, when the user taps a position on the screen of the monitor 4, the pointing cursor 900 moves to the tapped position and the computation results of the area of the polygon in the message 911 are updated, as shown in FIG. 24C.

Figure 24D:
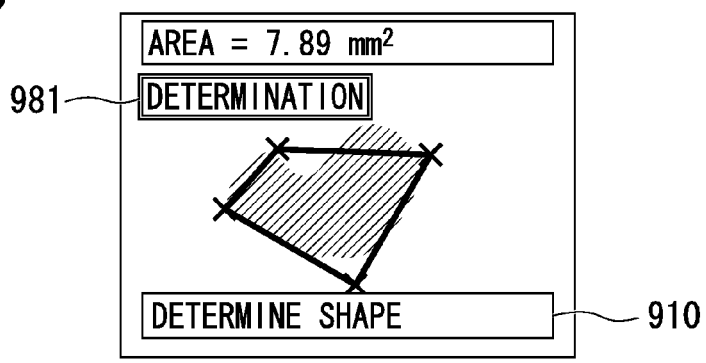
FIG. 24D is a view referentially showing an image displayed on the screen of the monitor included in the endoscope device according to the third embodiment of the present invention.

When the user taps the determine icon 981, the shape of the polygon is determined. FIG. 24D shows the image displayed on the screen of the monitor 4 when the determine icon 981 is tapped. As the determine icon 981 is tapped, the instruction for determining the shape of the polygon is input, and the moving vertex is changed to a determinate vertex. Further, the content of the message 910 is changed to the content for notifying the user that the shape of the polygon has been determined.

It may also set the polygon displayed at the time of starting the area measurement to a triangle or a pentagon and so on. For example, by the setting menu and so on not shown. Further, it may also change the length of one side of the polygon by the setting menu not shown, for example.

According to the present embodiment, the user may perform the designation of the shape of the polygon intuitively. Therefore, operability is improved.

While preferred embodiments of the present invention have been described, the present invention is not limited to the embodiments. Additions, omissions, substitutions, and other variations may be made to the present invention without departing from the spirit and scope of the present invention. The present invention is not limited by the above description, but by the appended claims.

What is claimed is:

1. A measuring device comprising:
   an imaging unit which images a subject to generate an image data;
   a display unit which displays an image based on the image data;
   a measuring unit which computes at least one of an area and a perimetrical length of a polygon, based on three or more measuring points including an indeterminate point of which a position is changed by a move instruction input through an operation unit, wherein the measuring points are designated on the image by an instruction of a user input through the operation unit; and
   a controller which controls the measuring unit to compute at least one of the area and the perimetrical length of the polygon based on the measuring points, and controls the display unit to display at least one of the computed area and the computed perimetrical length of the polygon as computational result,
   Wherein the controller which updates the position of the indeterminate point, when the move instruction is input through the operation unit after display the computational result, controls the measuring unit to recompute at least one of the area and the perimetrical length of the polygon based on the measuring points including the updated indeterminate point, and controls the display unit to display at least one of the recomputed area and the recomputed perimetrical length of the polygon, as recomputational result after updated the indeterminate point.

2. The measuring device according to claim 1, wherein the measuring points further comprise a determinate point of which a position is fixed regardless of the move instruction input through the operation unit.

3. The measuring device according to claim 2, wherein, when a determine instruction is input through the operation unit, the controller further changes at least one point of the indeterminate points to the determinate point.

4. The measuring device according to claim 2, wherein, when a modification instruction is input through the operation unit, the controller further selects any one of the determinate points, and changes the selected determinate point to the indeterminate point.

5. The measuring device according to claim 2, wherein, when an insert instruction is input through the operation unit, the controller further generates a new indeterminate point, deletes one of the sides which configures the polygon and include the two determinate points, and insert two sides including each of two of the determinate points included in the deleted side and the new added indeterminate points into the sides being configured with the polygon.

6. The measuring device according to claim 2, wherein the controller further changes the sides being configured with the polygon so that the sides do not cross each other, when at least one side of the two sides, which configure the polygon and include the indeterminate points, crosses any one of the sides composing the polygon other than the two sides.

7. The measuring device according to claim 3, wherein, when the determine instruction is input through the operation unit, the controller further generates a new indeterminate point.

8. The measuring device according to claim 4, wherein, when the determine instruction is input through the operation unit, the controller further generates a new indeterminate point.

9. The measuring device according to claim 5, wherein, when the determine instruction is input through the operation unit, the controller further generates a new indeterminate point.

10. The measuring device according to claim 6, wherein, when the determine instruction is input through the operation unit, the controller further generates a new indeterminate point.

11. The measuring device according to claim 9, wherein the controller generates a new indeterminate point at the position of the measuring point that is last changed to the determinate point.

12. The measuring device according to claim 9, wherein the controller controls to generate a new indeterminate point at the center of the side which composes the polygon and includes the measuring point last changed to the determinate point.

13. The measuring device according to claim 9, wherein the controller generates a new indeterminate point at the position deviating by a predetermined distance from the measuring point last changed to the determinate point.

14. The measuring device according to claim 10, wherein the controller generates a new indeterminate point at the position of the measuring point that is last changed to the determinate point.

15. The measuring device according to claim 10, wherein the controller controls to generate a new indeterminate point at the center of the side which composes the polygon and includes the measuring point last changed to the determinate point.

16. The measuring device according to claim 10, wherein the controller generates a new indeterminate point at the position deviating by a predetermined distance from the measuring point last changed to the determinate point.

17. A measuring method comprising:
- a first step of imaging a subject by an imaging unit to generate an image data, and displaying an image based on the generated image data by a display unit;
- a second step of computing at least one of an area and a perimetrical length of a polygon by a measuring unit based on three or more measuring points including an indeterminate point of which the position is changed by a move instruction input through an operation unit, wherein the measuring points are designated on the image by an instruction of a user input through the operation unit;
- a third step of displaying at least one of the area and the perimetrical length of the polygon computed in the second step by the display unit;
- a fourth step of updating the position of the indeterminate point by a controller when the move instruction is input through the operation unit after the third step;
- a fifth step of computing at least one of the area and the perimetrical length of the polygon by the measuring unit based on the measuring point including the updated indeterminate point; and
- a sixth step of displaying at least one of the area and the perimetrical length of the polygon computed in the fifth step by the display unit.

* * * * *